United States Patent
Kimura

(10) Patent No.: US 11,835,698 B2
(45) Date of Patent: Dec. 5, 2023

(54) ZOOM LENS AND IMAGE PICKUP APPARATUS HAVING THE SAME

(71) Applicant: CANON KABUSHIKI KAISHA, Tokyo (JP)

(72) Inventor: Kohei Kimura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 431 days.

(21) Appl. No.: 17/306,983

(22) Filed: May 4, 2021

(65) Prior Publication Data

US 2021/0356722 A1 Nov. 18, 2021

(30) Foreign Application Priority Data

May 14, 2020 (JP) ................... 2020-085406

(51) Int. Cl.
  *G02B 15/14* (2006.01)
  *G02B 15/20* (2006.01)
  *G02B 15/177* (2006.01)

(52) U.S. Cl.
  CPC . *G02B 15/144515* (2019.08); *G02B 15/1465* (2019.08); *G02B 15/144507* (2019.08); *G02B 15/177* (2013.01); *G02B 15/20* (2013.01)

(58) Field of Classification Search
  CPC ........ G02B 15/144515; G02B 15/1465; G02B 15/144507; G02B 15/177; G02B 15/20
  USPC .......................................... 359/686
  See application file for complete search history.

(56) References Cited

U.S. PATENT DOCUMENTS

| 10,215,972 | B2 | 2/2019 | Gyoda et al. |
| 10,222,594 | B2 | 3/2019 | Kimura |
| 10,670,834 | B2 | 6/2020 | Kimura |
| 2002/0122262 | A1* | 9/2002 | Nanba .................. G02B 15/177 359/689 |
| 2020/0132974 | A1 | 4/2020 | Kimura et al. |
| 2020/0257095 | A1 | 8/2020 | Kimura et al. |

FOREIGN PATENT DOCUMENTS

| JP | 4984231 B2 | 7/2012 |
| JP | 5891860 B2 | 3/2016 |

* cited by examiner

*Primary Examiner* — Wyatt A Stoffa
*Assistant Examiner* — Mitchell T Oestreich
(74) *Attorney, Agent, or Firm* — Carter, DeLuca & Farrell LLP

(57) ABSTRACT

A zoom lens includes, in order from an object side to an image side, a first lens unit having a negative refractive power, a second lens unit having a positive refractive power, and three or more lens units. A distance between adjacent lens units varies during zooming. A predetermined condition is satisfied.

20 Claims, 11 Drawing Sheets

ZOOM LENS AND IMAGE PICKUP APPARATUS HAVING THE SAME

BACKGROUND OF THE INVENTION

Field of the Invention

The present invention relates to zoom lens, which is suitable for an image pickup apparatus, such as a digital video camera, a digital still camera, a broadcasting camera, a film-based camera, and a surveillance camera.

Description of the Related Art

Along with the increasing functionality of image pickup apparatuses, there has recently been a demand for a compact and lightweight zoom lens having a large aperture ratio. One known zoom lens that satisfies this requirement is a negative lead type zoom lens in which a lens unit having a negative refractive power is disposed closest to the object.

Japanese Patent No. ("JP") 4984231 discloses a zoom lens that includes, in order from an object side to an image side, first to fifth lens units having negative, positive, negative, positive, and positive refractive powers, wherein the first lens unit moves to the image side and then moves to the object side during zooming.

JP 5891860 discloses a mirrorless type zoom lens that includes, in order from the object side to the image side, first to fourth lens units having negative, positive, negative, and positive refractive powers.

In the zoom lens disclosed in JP 4984231, the first lens unit has a strong refractive power and draws a substantially reciprocating locus during zooming, so that the overall lens length at the telephoto end becomes long. In addition, this zoom lens has a long backfocus, and it is difficult to reduce the overall lens length. Further, a long distance on the optical axis from a lens surface closest to the object to a lens surface closest to an image plane in the first lens unit, which is necessary to correct the aberration in the first lens unit, is not suitable for the miniaturization and weight reduction.

The zoom lens disclosed in JP 5891860 has a four-unit structure, and if a larger aperture ratio is designed, various aberrations at the telephoto end and aberrational fluctuations during zooming cannot be suppressed, and it is difficult to realize a high optical performance in the overall zoom range.

SUMMARY OF THE INVENTION

The present invention provides a compact zoom lens having a large aperture ratio and a high optical performance, and an image pickup apparatus having the same.

A zoom lens according to one aspect of the present invention includes, in order from an object side to an image side, a first lens unit having a negative refractive power, a second lens unit having a positive refractive power, and three or more lens units. A distance between adjacent lens units varies during zooming. The following conditional expressions are satisfied:

$$4.8 < m1 \cdot f1/skw^2 < 15.0$$

$$2.45 < \beta 2t/\beta 2w < 50.00$$

where m1 is a moving amount of the first lens unit during zooming from a wide-angle end to a telephoto end, f1 is a focal length of the first lens unit, skw is a backfocus at the wide-angle end, $\beta 2t$ is a lateral magnification of the second lens unit at the telephoto end, and $\beta 2w$ is a lateral magnification of the second lens unit at the wide-angle end.

An image pickup apparatus having the above zoom lens also constitutes another aspect of the present invention.

Further features of the present invention will become apparent from the following description of exemplary embodiments with reference to the attached drawings.

DESCRIPTION OF THE EMBODIMENTS

Figure 1:
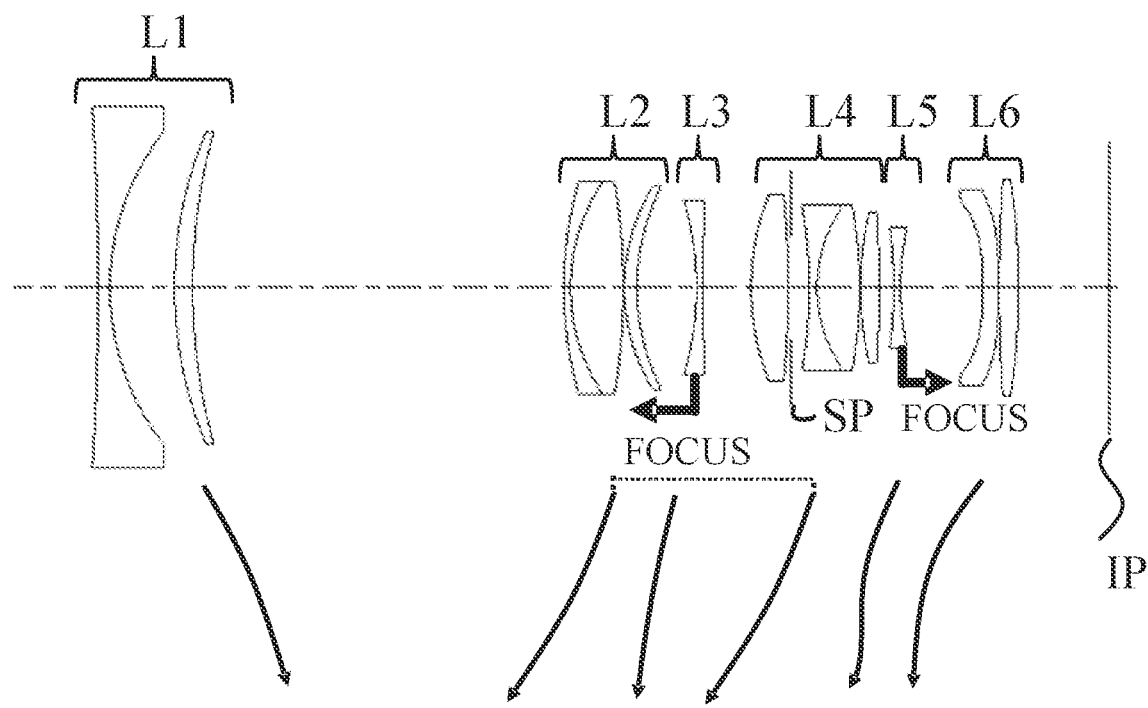
FIG. 1 is a sectional view of a zoom lens according to Example 1 at a wide-angle end.
Figure 2A:
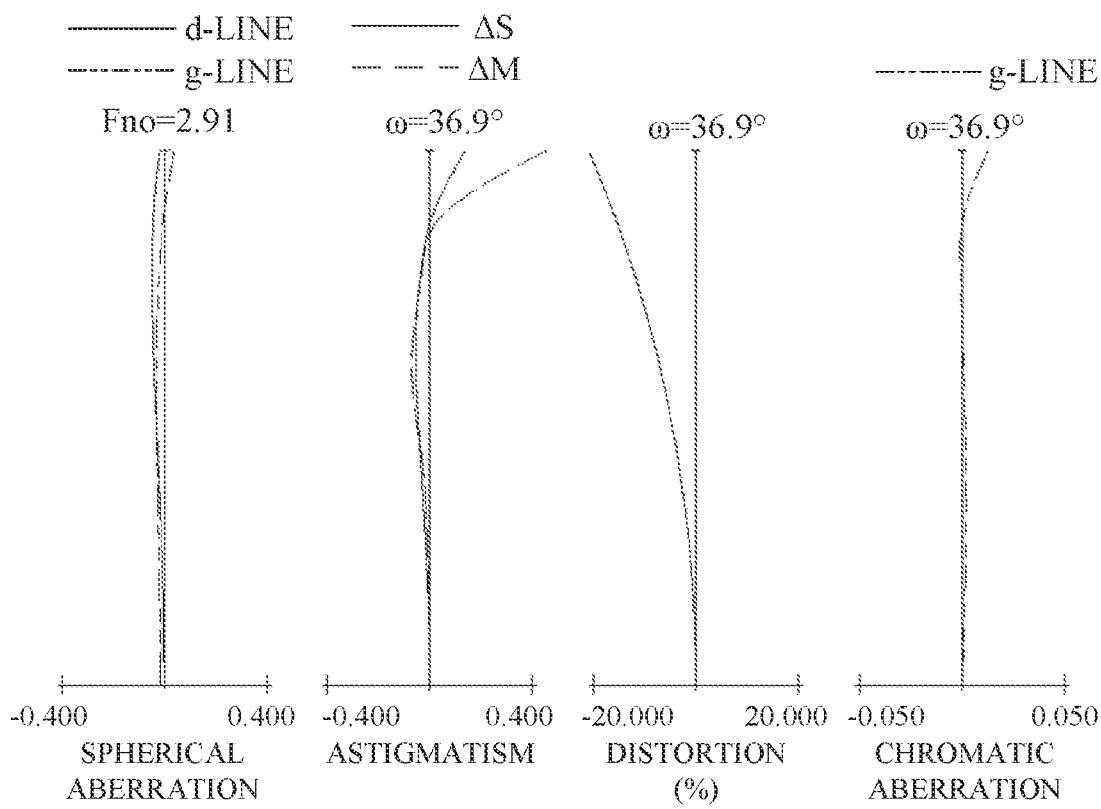
FIGS. 2A to 2C are longitudinal aberration diagrams of the zoom lens according to Example 1 at the wide-angle end (FIG. 2A), a middle zoom position (FIG. 2B), and a telephoto end (FIG. 2C).
Figure 2B:
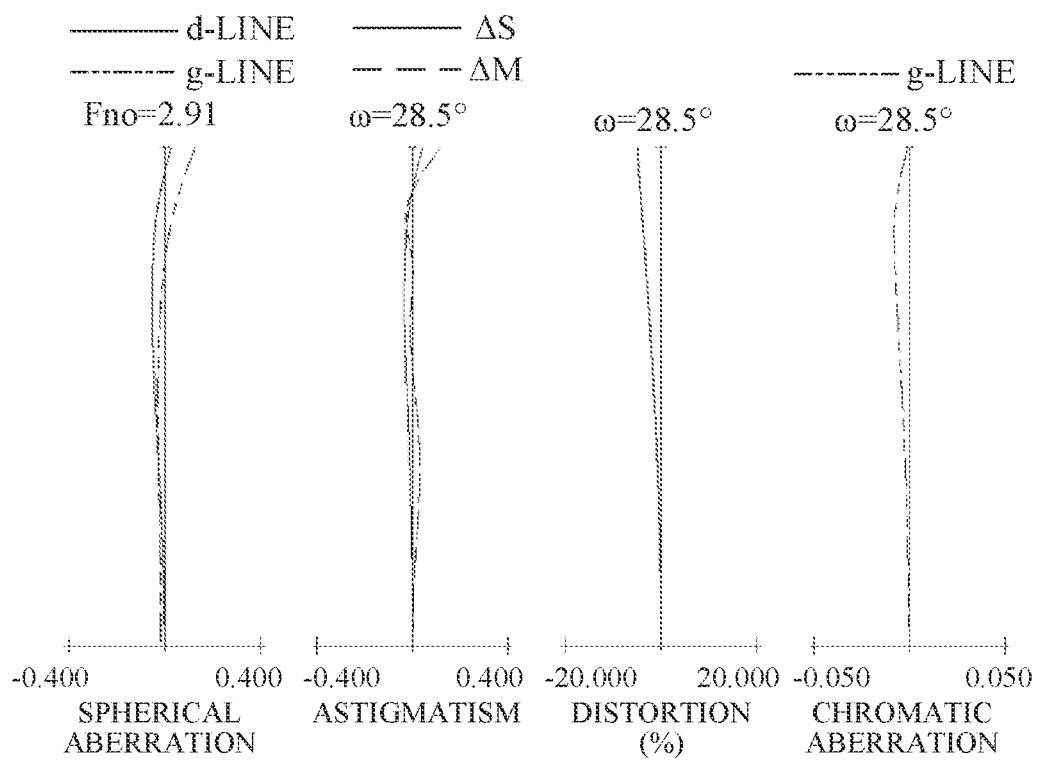
Figure 2C:
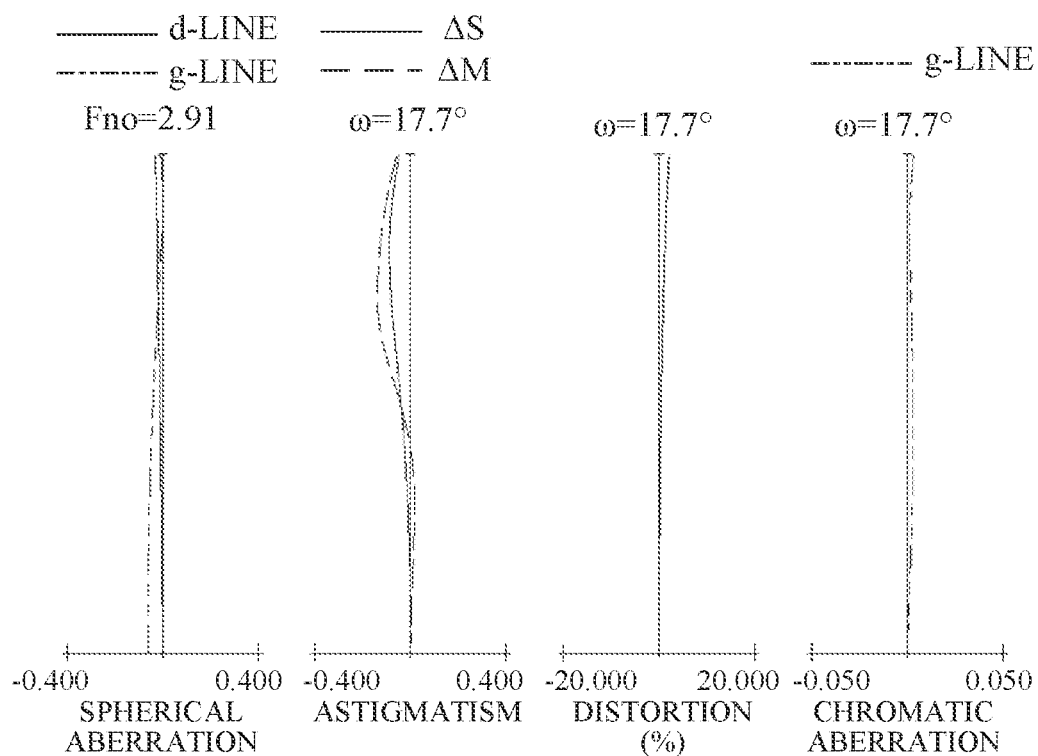
Figure 3:
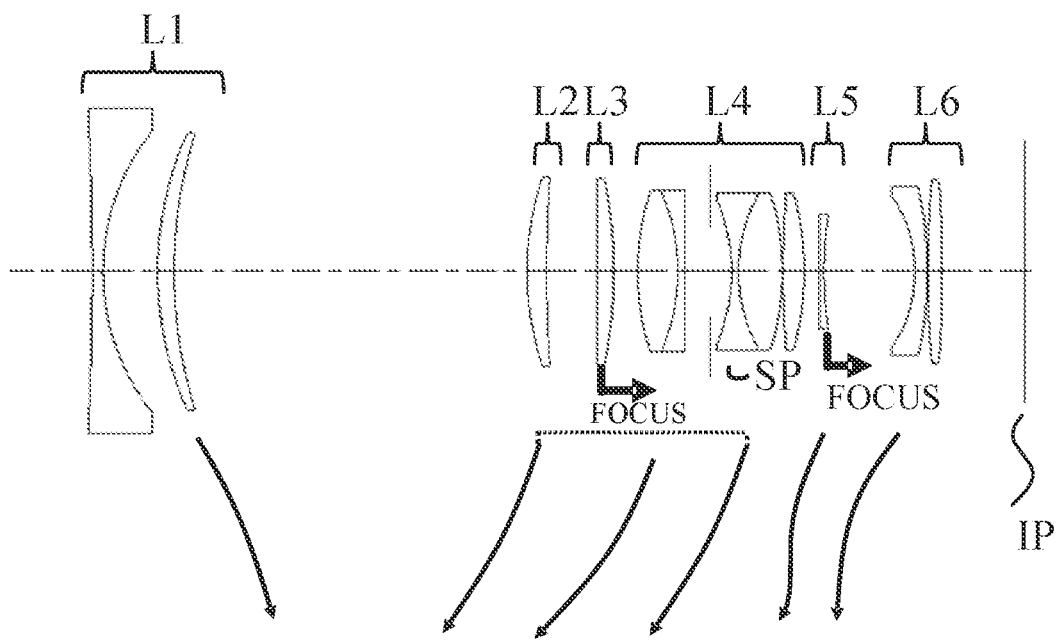
FIG. 3 is a sectional view of a zoom lens according to Example 2 at a wide-angle end.
Figure 4A:
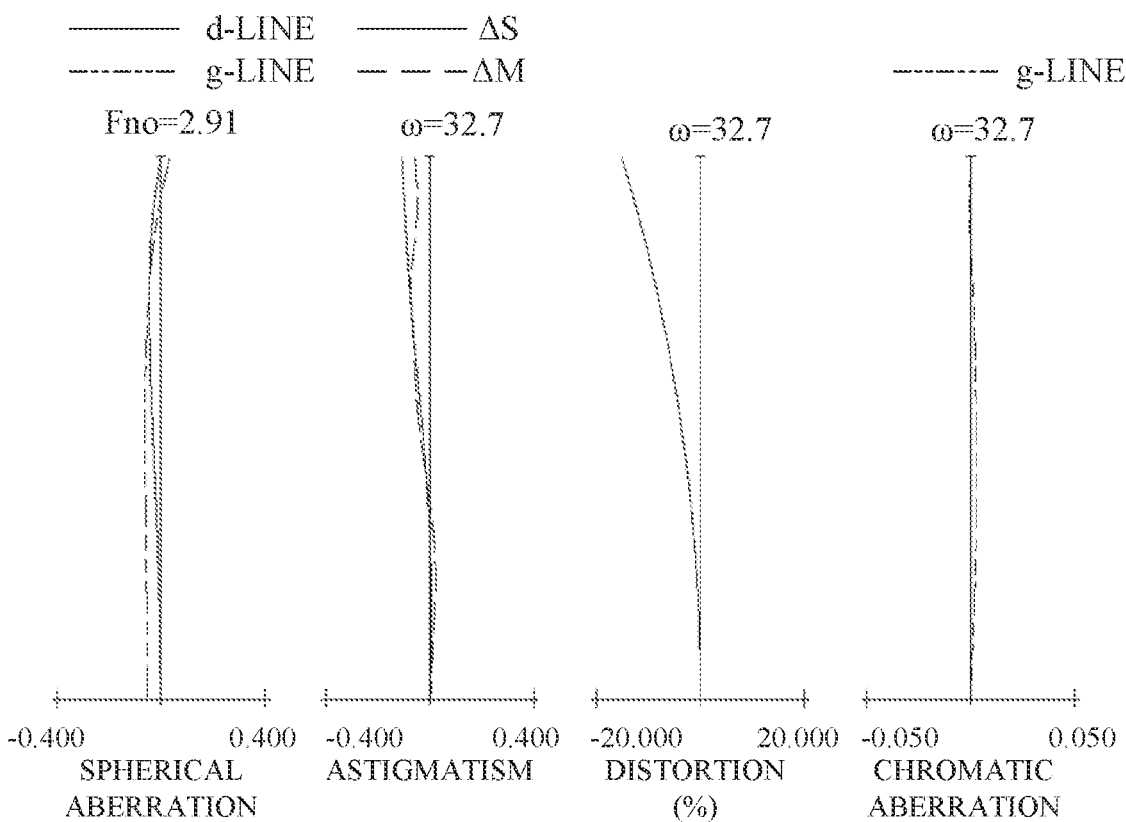
FIGS. 4A to 4C are longitudinal aberration diagrams of the zoom lens according to Example 2 at the wide-angle end (FIG. 4A), a middle zoom position (FIG. 4B), and a telephoto end (FIG. 4C).
Figure 4B:
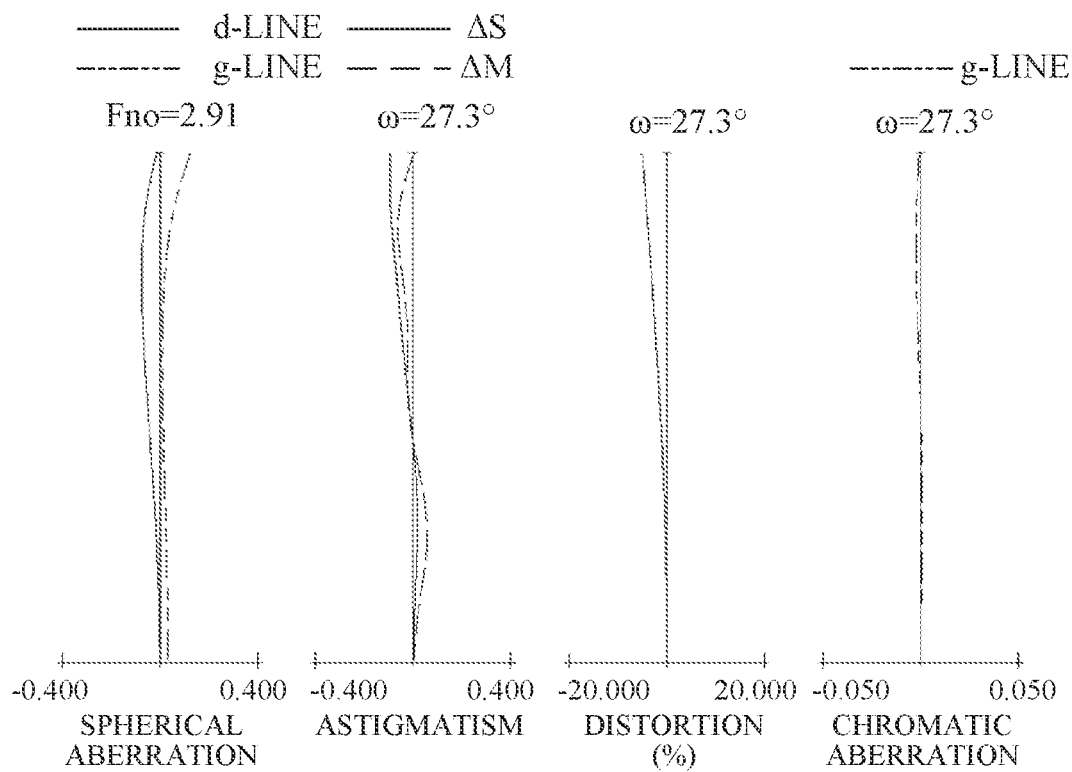
Figure 4C:
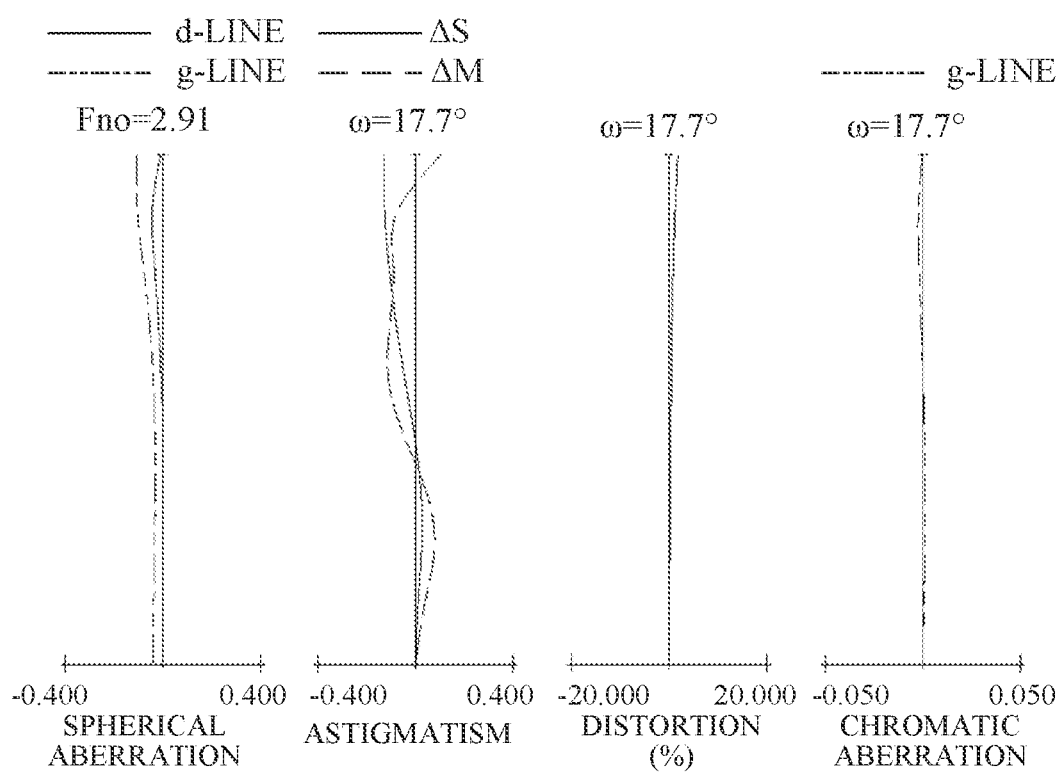
Figure 5:
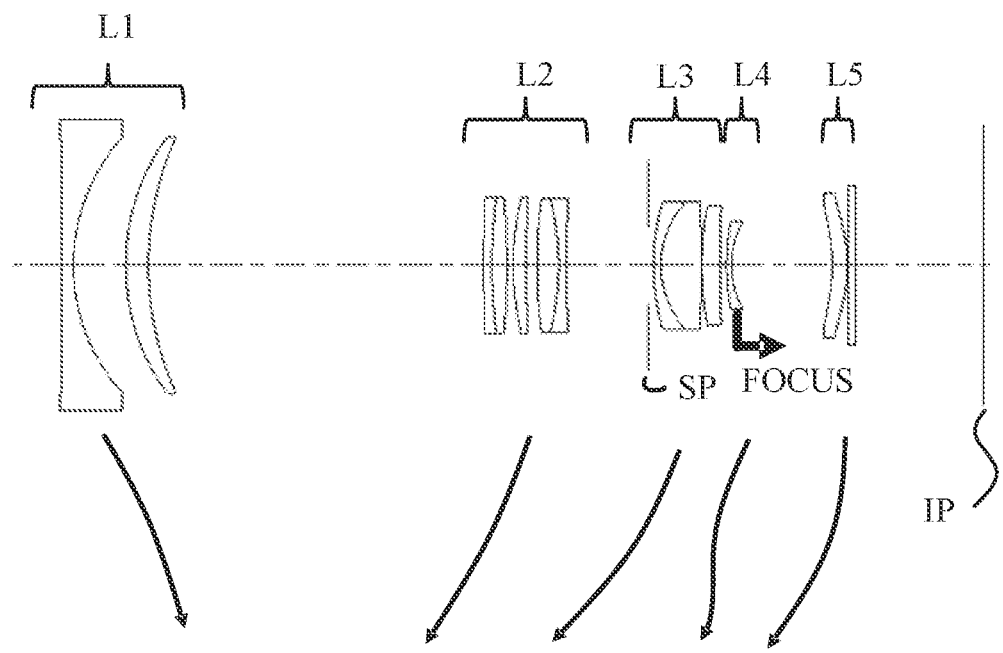
FIG. 5 is a sectional view of a zoom lens according to Example 3 at a wide-angle end.
Figure 6A:
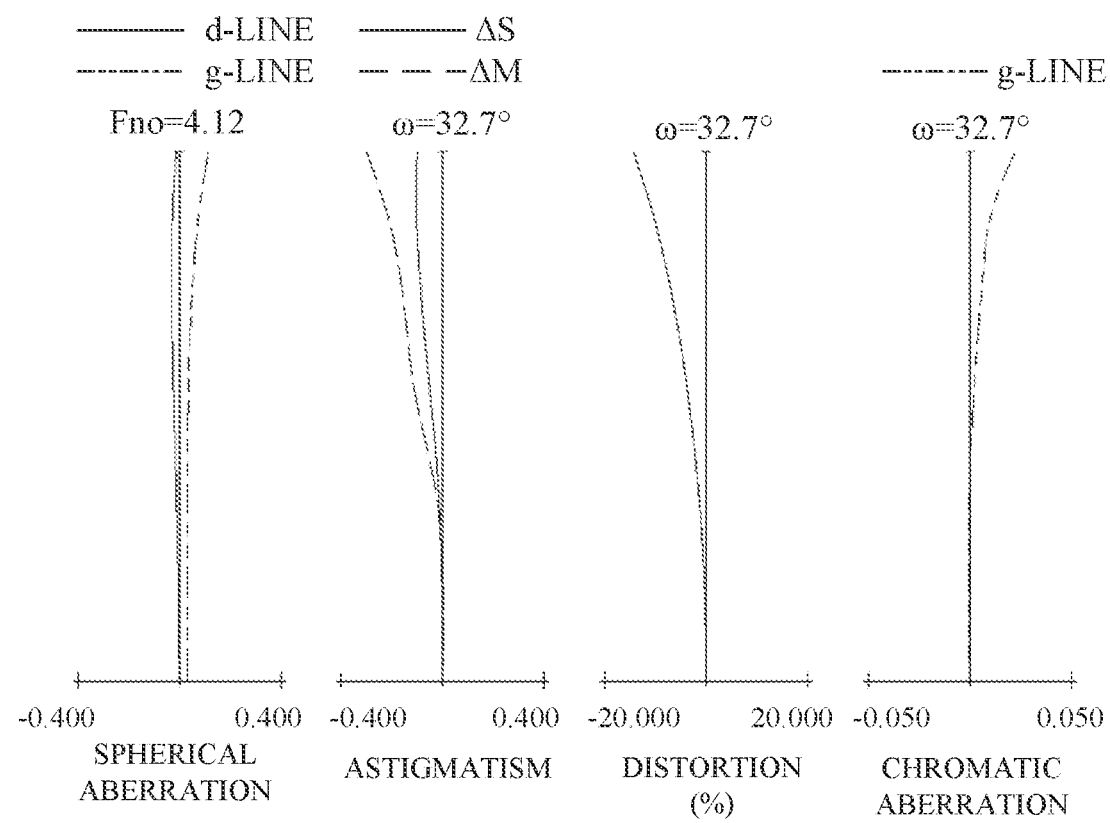
FIGS. 6A to 6C are longitudinal aberration diagrams of the zoom lens according to Example 3 at the wide-angle end (FIG. 6A), a middle zoom position (FIG. 6B), and a telephoto end (FIG. 6C).
Figure 6B:
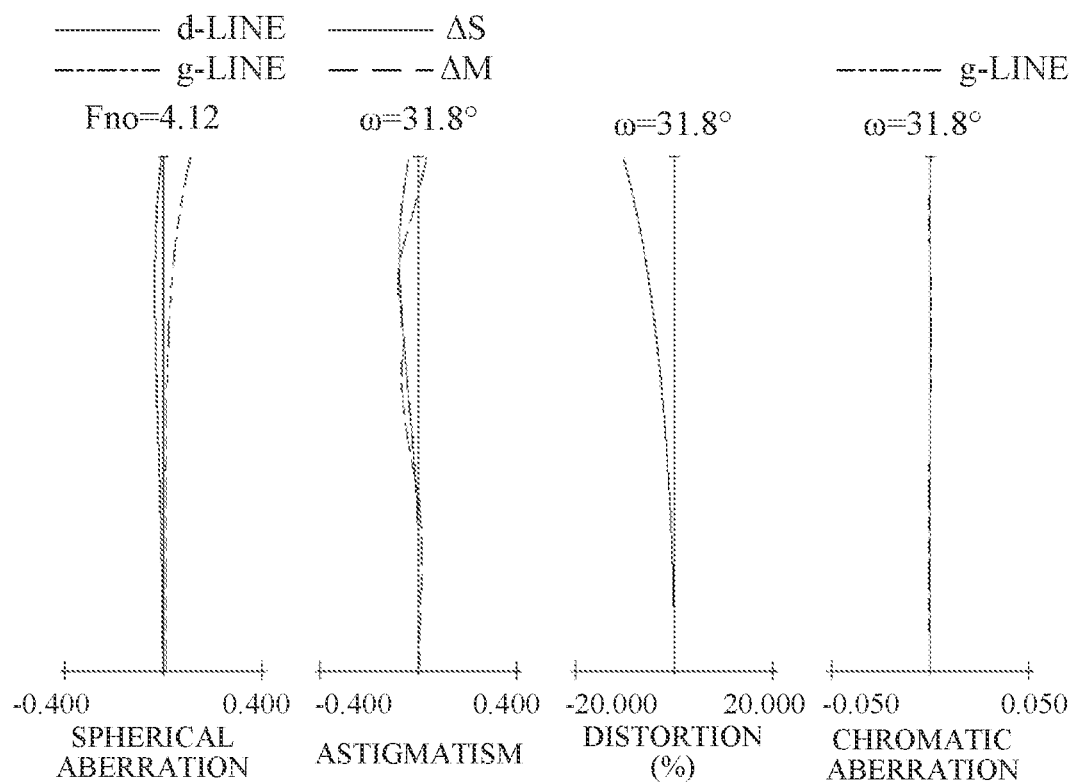
Figure 6C:
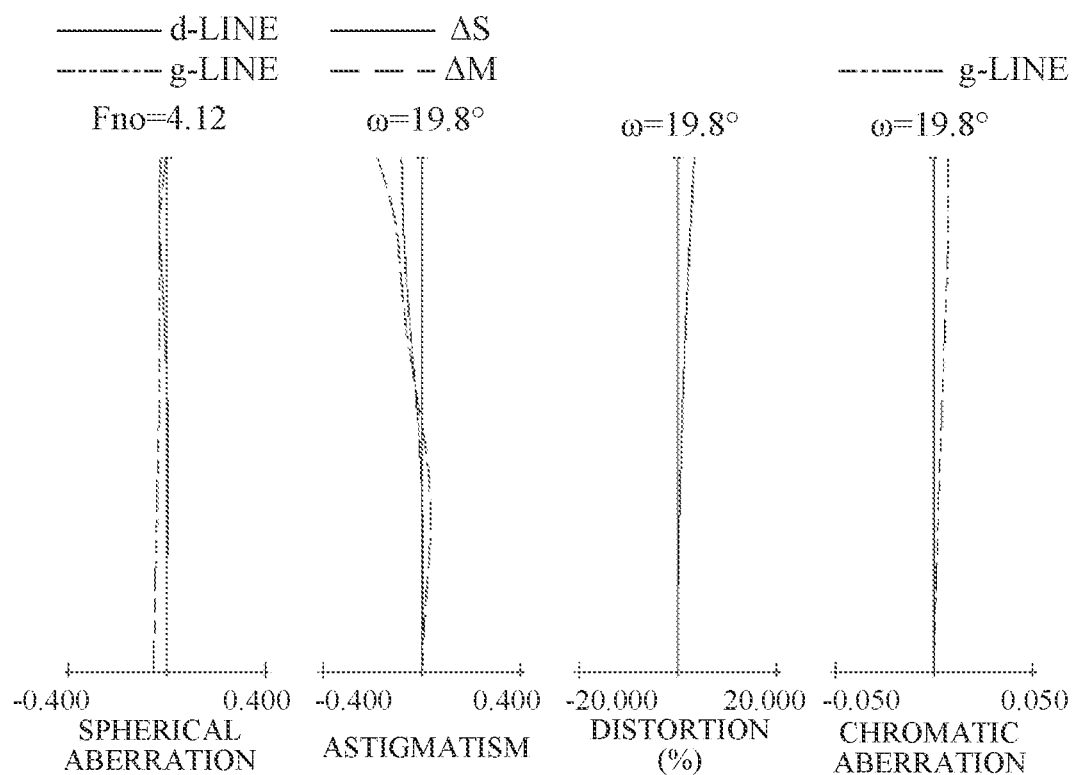
Figure 7:
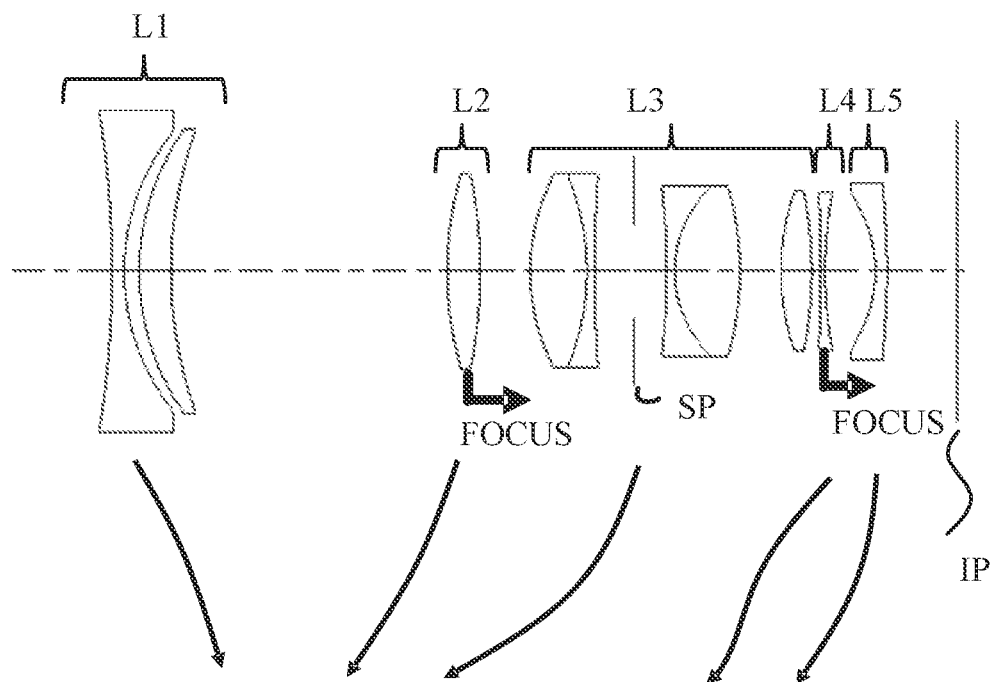
FIG. 7 is a sectional view of a zoom lens according to Example 4 at a wide-angle end.
Figure 8A:
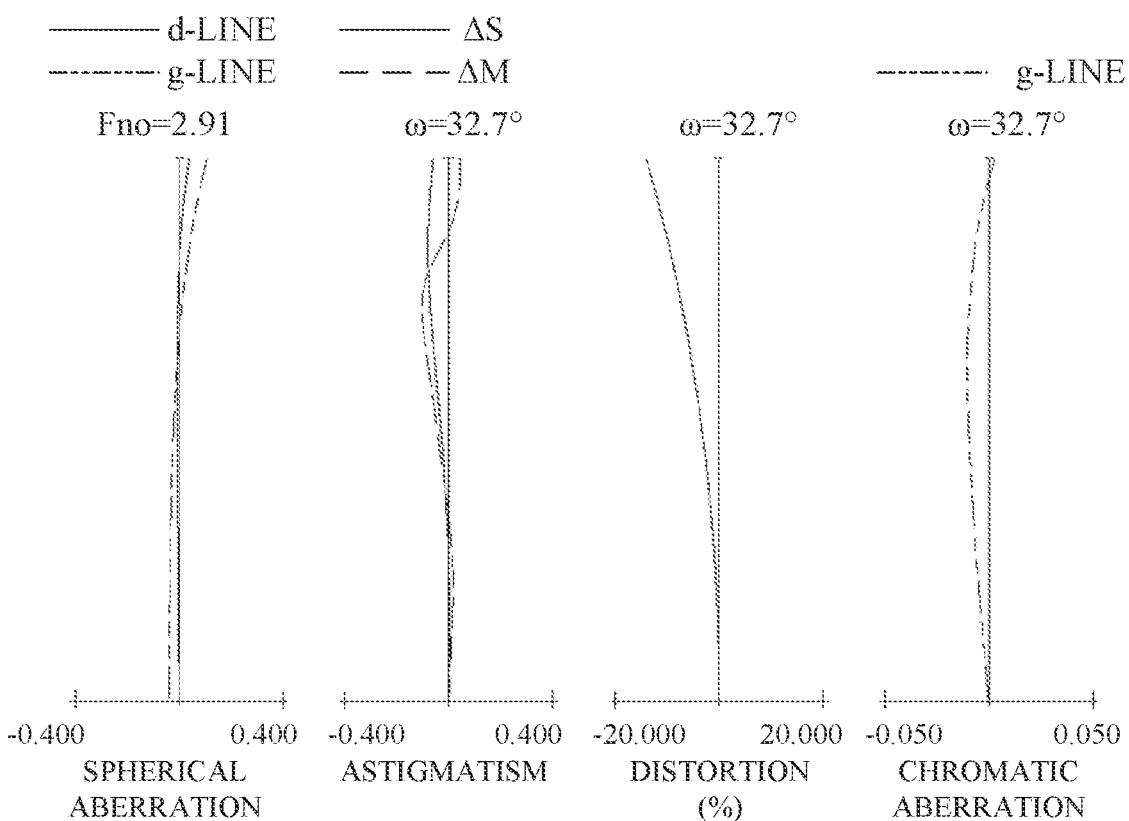
FIGS. 8A to 8C are longitudinal aberration diagrams of the zoom lens according to Example 4 at the wide-angle end (FIG. 8A), a middle zoom position (FIG. 8B), and a telephoto end (FIG. 8C).
Figure 8B:
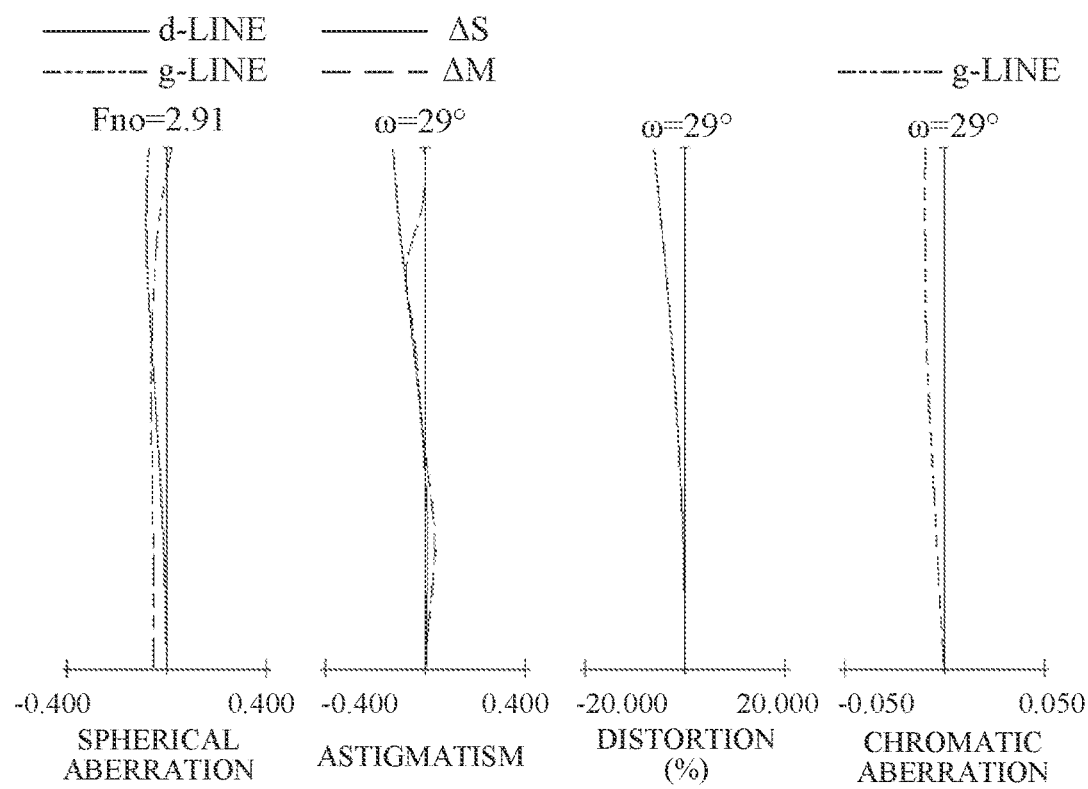
Figure 8C:
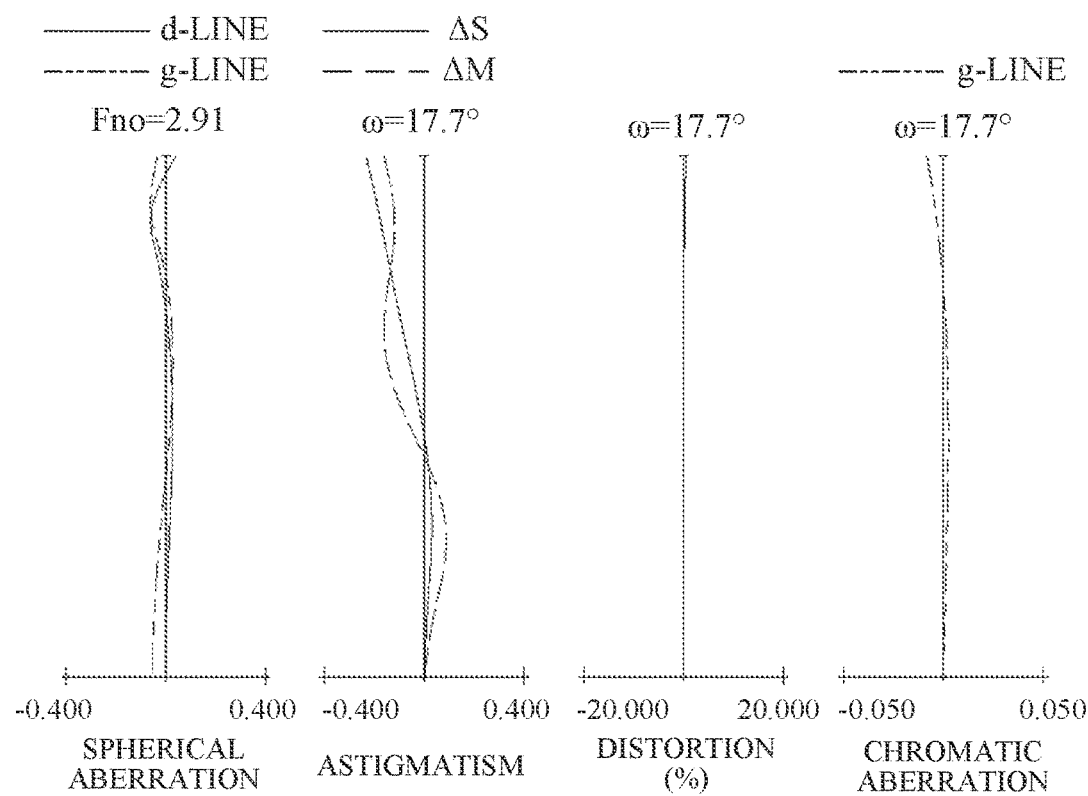
Figure 9:
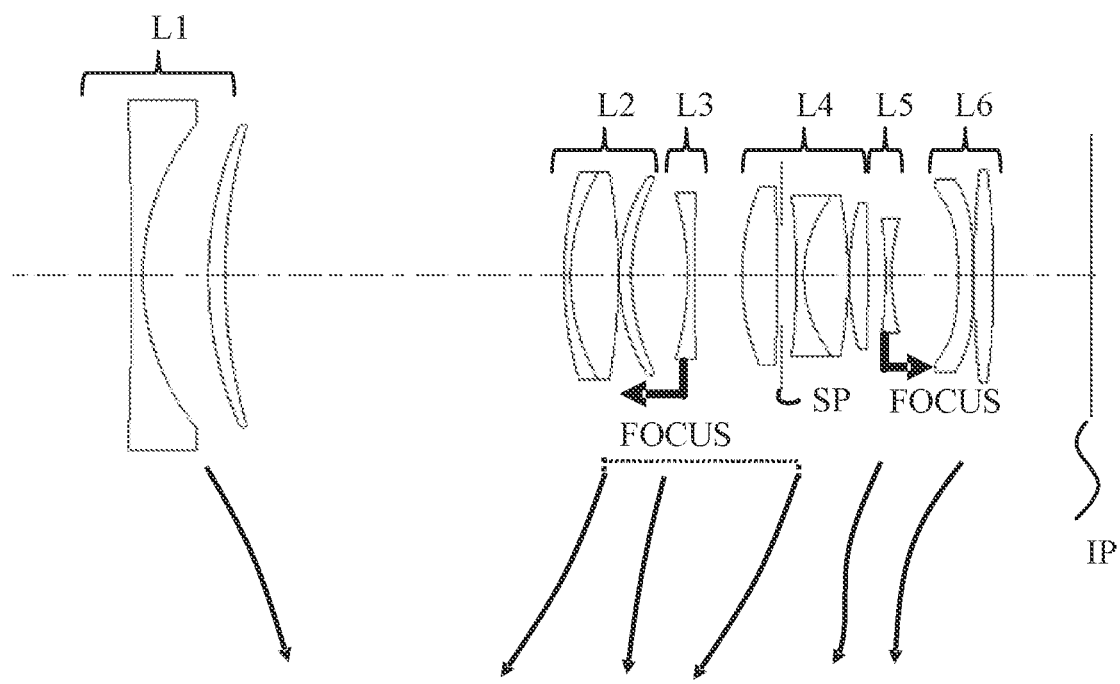
FIG. 9 is a sectional view of a zoom lens according to Example 5 at a wide-angle end.
Figure 10A:
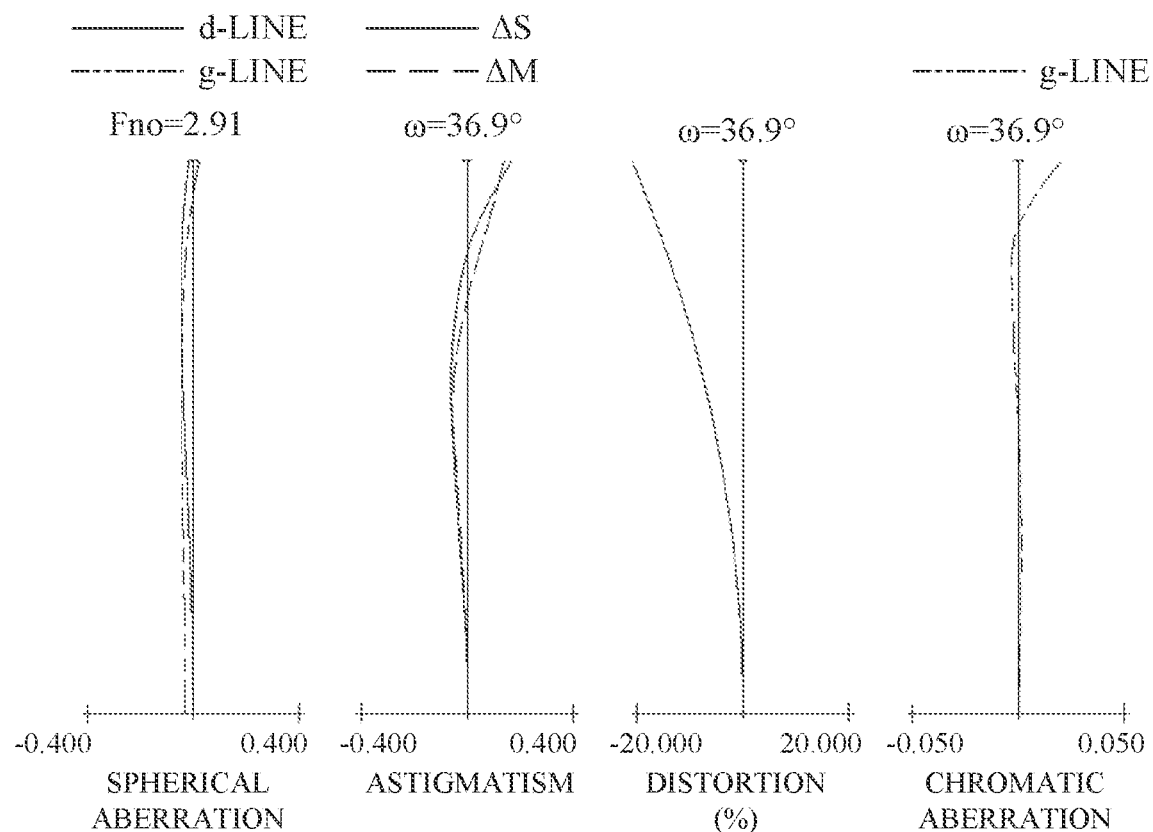
FIGS. 10A to 10C are aberration diagrams of the zoom lens according to Example 5 at the wide-angle end (FIG. 10A), a middle zoom position (FIG. 10B), and a telephoto end (FIG. 10C).
Figure 10B:
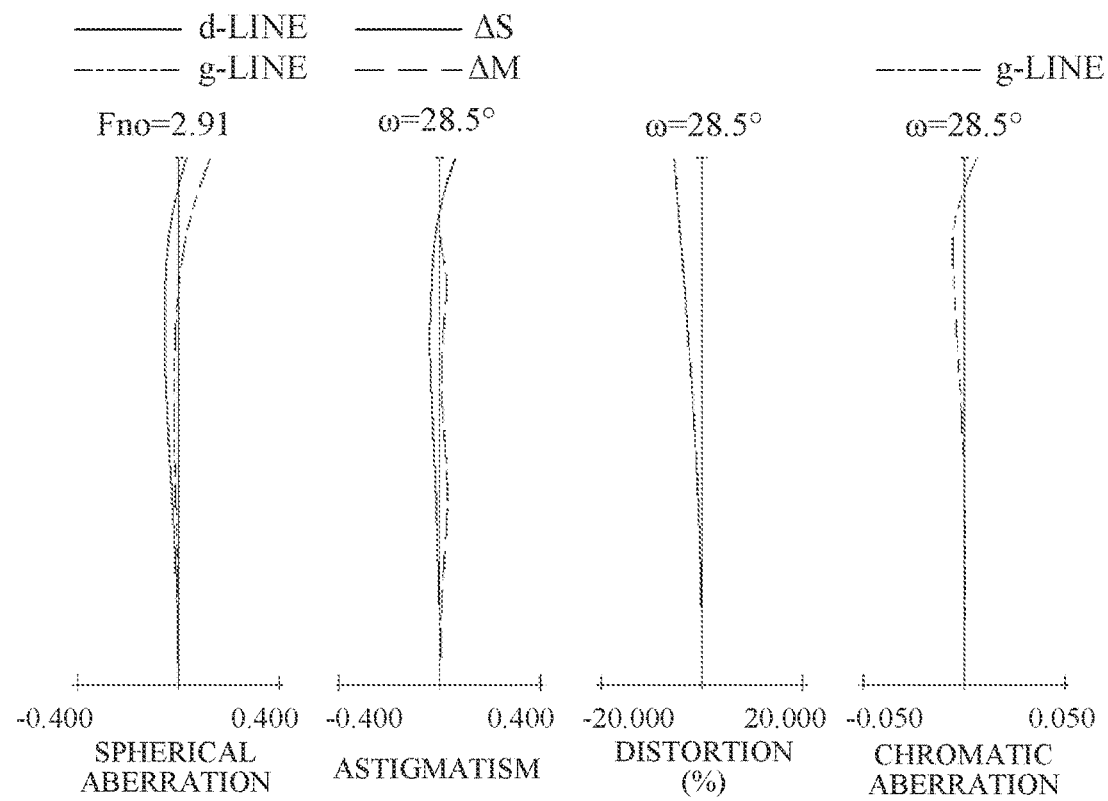
Figure 10C:
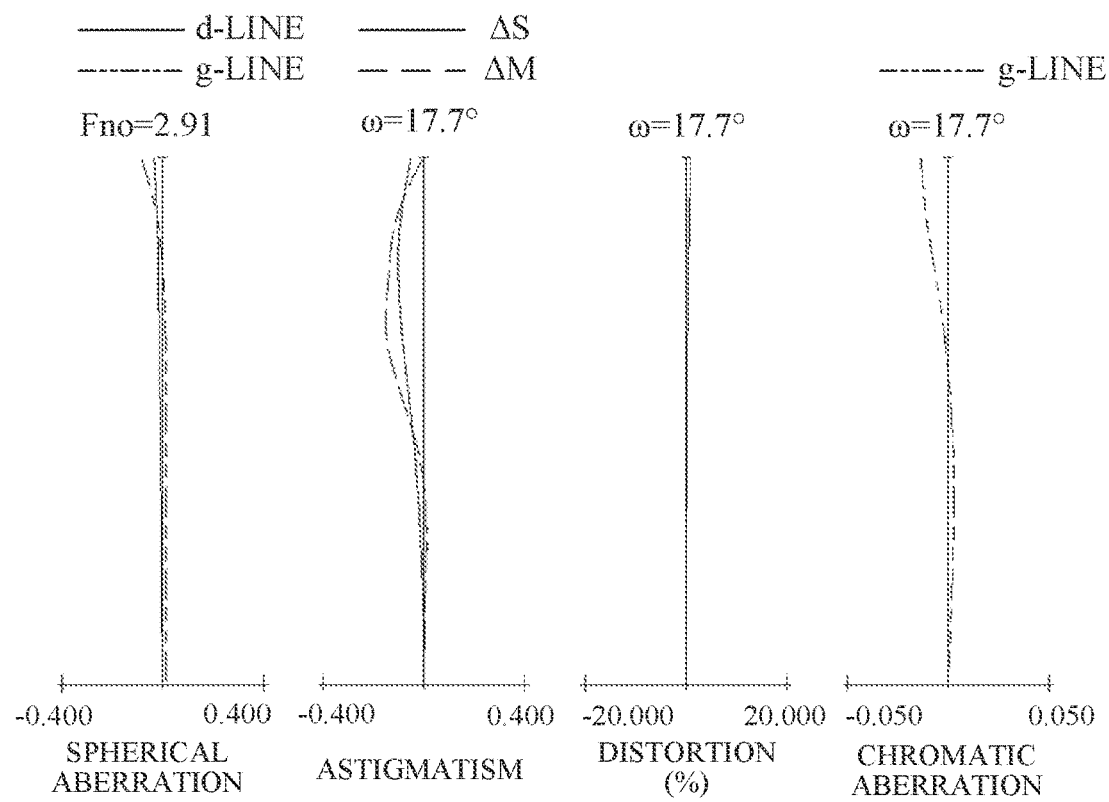

Referring now to the accompanying drawings, a detailed description will be given of embodiments according to the present invention. Corresponding elements in respective figures will be designated by the same reference numerals, and a duplicate description thereof will be omitted.

FIGS. 1, 3, 5, 7, and 9 are sectional views of zoom lenses according to Examples 1 to 5, respectively, at the wide-angle end. The zoom lens according to each example is used in an image pickup apparatus such as a digital video camera, a digital still camera, a broadcasting camera, a film-based camera, and a surveillance camera. Further, the zoom lens according to each example can also be used as a projection optical system for a projection apparatus (projector).

In each sectional view, the left side is the object side and the right side is the image side. The zoom lens according to each example includes a plurality of lens units. In this specification, a lens unit is a group of lenses that move or stand still integrally during zooming. That is, in the zoom lenses according to each example, a distance between adjacent lens units varies during zooming. An arrow shown in each sectional view indicates a moving direction of a lens unit during zooming from the wide-angle end to the telephoto end. An arrow with Focus indicates a moving direction of a focus unit during focusing from an object at infinity (infinity object) to a short-distance object. The lens unit may include one or more lenses. The lens unit may include a diaphragm (aperture stop).

The zoom lenses according to each example includes, in order from the object side to the image side, a first lens unit L1 having a negative refractive power, a second lens unit L2 having a positive refractive power, and three or more subsequent lens units. A structure on the image side of the second lens unit L2, which has a thicker light beam width, has a multi-unit structure with three or more lens units, and each lens unit moves with an independent trajectory during zooming so as to suppress fluctuations of the spherical aberration and coma during zooming in a large-diameter zoom lens.

In each sectional view, Li represents an i-th lens unit (where i is a natural number) counted from the object side among the lens units included in the zoom lens. SP represents the diaphragm (aperture stop). IP represents an image plane, and when the zoom lens according to each example is used as an imaging optical system of a digital still camera or a digital video camera, the imaging surface of a solid-state image sensor (photoelectric conversion element) such as a CCD sensor and a CMOS sensor is placed there. When the zoom lens according to each example is used as an imaging optical system of the film-based camera, a photosensitive surface corresponding to a film plane is placed on the image plane IP.

FIGS. 2A to 2C, 4A to 4C, 6A to 6C, 8A to 8C, 10A to 10C are longitudinal aberration diagrams of the zoom lenses according to Examples 1 to 5, respectively. In each aberration diagram, FIGS. 2A, 4A, 6A, 8A, and 10A are longitudinal aberration diagrams at the wide-angle end, FIGS. 2B, 4B, 6B, 8B, and 10B are longitudinal aberration diagrams at a middle zoom position, and FIGS. 2C, 4C, 6C, 8C, and 10C are longitudinal aberration diagrams at the telephoto end.

In a spherical aberration diagram, Fno represents an F-number and shows spherical aberration amounts for the d-line (wavelength 587.6 nm) and the g-line (wavelength 435.8 nm). In a astigmatism diagram, $\Delta S$ represents an astigmatism amount on a sagittal image plane for the d-line, and $\Delta M$ represents an astigmatism amount on a meridional image plane for the d-line. A distortion diagram shows a distortion amount for the d-line. A chromatic aberration diagram shows a chromatic aberration amount for the g-line. $\omega$ is a half angle of view (degrees).

Next follows a description of a characteristic structure of the zoom lens according to each example.

In the zoom lens according to each example, the distance between adjacent lens units varies during zooming from the wide-angle end to the telephoto end. In each example, the zoom locus is set so that the overall length of the zoom lens (overall lens length) is the shortest at the telephoto end. During zooming, the main magnification variation is performed by greatly reducing the distance between the first lens unit L1 and the second lens unit L2. In particular, the second lens unit L2 has a strong refractive power and a large magnification varying effect when it is significantly moved to the object side during zooming.

The zoom lens according to each example satisfies the following conditional expression (1):

$$4.8 < m1 \cdot f1/skw^2 < 15.0 \tag{1}$$

where m1 is a moving amount (zoom moving amount) of the first lens unit L1 during zooming from the wide-angle end to the telephoto end, f1 is a focal length of the first lens unit L1, and skw is a backfocus at the wide-angle end. In this example, the moving amount of the lens unit corresponds to a difference between the position on the optical axis at the wide-angle end and the position on the optical axis at the telephoto end. The sign of the moving amount is set negative when the lens unit is located on the image side at the telephoto end relative to its position at the wide-angle end, and positive when the lens unit is located on the object side at the telephoto end relative to its position at the wide-angle end.

The conditional expression (1) defines a relationship among the zoom moving amount m1 of the first lens unit L1, the focal length f1 of the first lens unit L1, and the backfocus skw at the wide-angle end, in order to reduce the overall lens length at the wide-angle end and to correct the aberrations in the overall zoom range.

If the zoom moving amount m1 of the first lens unit L1 becomes larger and the value becomes higher than the upper limit in the conditional expression (1), the overall lens length at the wide-angle end becomes long and the front lens diameter also becomes large. If the focal length f1 of the first lens unit L1 becomes longer and the value becomes higher than the upper limit in the conditional expression (1), the refractive power of the first lens unit L1 becomes weaker, and the negative refractive power arrangement of the retrofocus at the wide-angle end weakens. This may prevent a short overall lens length. If the backfocus skw at the wide-angle end becomes smaller and the value becomes higher than the upper limit in the conditional expression (1), the mechanical layout of the connector between the lens and the camera becomes difficult.

If the zoom moving amount m1 of the first lens unit L1 becomes smaller and the value becomes lower than the lower limit in the conditional expression (1), it becomes difficult to obtain a desired zoom magnification. If the focal length f1 of the first lens unit L1 becomes shorter and the value becomes lower than the lower limit in the conditional expression (1), it is advantageous for a short overall lens length at the wide-angle end and a small front lens diameter but it is difficult to correct the lateral chromatic aberration and the distortion generated in the first lens unit L1 using the subsequent lens units. If the backfocus skw at the wide-angle end becomes larger and the value becomes lower than the lower limit in the conditional expression (1), reducing the overall lens length may be prevented.

The zoom lens according to each example satisfies the following conditional expression (2):

$$2.45 < \beta 2t/\beta 2w < 50.00 \tag{2}$$

where $\beta 2t$ is a lateral magnification of the second lens unit L2 at the telephoto end and $\beta 2w$ is a lateral magnification of the second lens unit L2 at the wide-angle end.

The conditional expression (2) defines a ratio of the lateral magnification $\beta 2t$ of the second lens unit L2 at the telephoto end to the lateral magnification $\beta 2w$ of the second lens unit L2 at the wide-angle end or a so-called magnification varying ratio of second lens unit L2, in order to reduce the overall lens length and the diameter of the lens barrel.

If the magnification varying ratio of the second lens unit L2 is higher than the upper limit in the conditional expression (2), it is advantageous for increasing the magnification and for reducing the lens diameters of the subsequent lens units. However, it is difficult to suppress the spherical aberration, the coma, and the longitudinal chromatic aberration generated in the second lens unit L2.

If the magnification varying ratio of the second lens unit L2 is smaller and the value becomes lower than the lower limit in the conditional expression (2), it is necessary to increase the refractive powers and zoom moving amounts of the first lens unit L1 and the subsequent lens units in order to obtain a desired zoom magnification and this may prevent a reduced overall lens length and an improved optical performance.

The zoom lens according to each example may further satisfy the following conditional expression (3):

$$0.05 < TD1/ft < 0.50 \quad (3)$$

where TD1 is a distance on the optical axis (overall thickness of the first lens unit L1) from a lens surface closest to the object to a lens surface closest to the image plane in the first lens unit L1, and ft is a focal length of the zoom lens at the telephoto end.

The conditional expression (3) defines a relationship between the overall thickness TD1 of the first lens unit L1 and the focal length ft of the zoom lens at the telephoto end, in order to reduce the overall lens length and the front lens diameter.

If the overall thickness TD1 of the first lens unit L1 becomes longer and the value becomes higher than the upper limit in the conditional expression (3), the overall lens length at the wide-angle end becomes longer and the front lens diameter becomes larger. If the focal length ft of the zoom lens at the telephoto end becomes shorter and the value becomes higher than the upper limit in the conditional expression (3), a sufficient focal length and zoom magnification at the telephoto end are unavailable.

If the overall thickness TD1 of the first lens unit L1 becomes shorter and the value becomes lower than the lower limit in the conditional expression (3), it is advantageous for the reduced overall lens length and front lens diameter at the wide-angle end but it becomes difficult to arrange refractive powers so as to correct the curvature of field and the lateral chromatic aberration generated in the first lens unit L1 at the wide-angle end and it becomes difficult to maintain the optical performance. If the focal length ft of the zoom lens at the telephoto end becomes longer and the value becomes lower than the lower limit in the conditional expression (3), a desired angle of view is available, but it becomes difficult to sufficiently correct the longitudinal chromatic aberration and spherical aberration generated at the telephoto end.

The zoom lens according to each example may further satisfy the following conditional expression (4):

$$-4.0 < f1/fw < -1.0 \quad (4)$$

where fw is a focal length of the zoom lens at the wide-angle end.

The conditional expression (4) defines a relationship between the focal length f1 of the first lens unit L1 and the focal length fw of the zoom lens at the wide-angle end in order to obtain the required zoom ratio.

If the focal length f1 of the first lens unit L1 becomes shorter and the value becomes higher than the upper limit in the conditional expression (4), the zoom lens can be easily made smaller but it is difficult to satisfactorily correct the distortion and lateral chromatic aberration at the wide-angle end with a small number of lenses. If the focal length fw of the zoom lens at the wide-angle end is longer and the value becomes higher than the upper limit in the conditional expression (4), it becomes difficult to secure a desired zoom ratio.

If the focal length f1 of the first lens unit L1 becomes longer and the value becomes lower than the lower limit in the conditional expression (4), it becomes easier to correct the lateral chromatic aberration at the wide-angle end and the longitudinal chromatic aberration at the telephoto end, but the zoom moving amount m1 of the first lens unit L1 becomes large and the overall lens length becomes long. If the focal length fw of the zoom lens at the wide-angle end becomes shorter and the value becomes lower than the lower limit in the conditional expression (4), the front lens diameter becomes larger as the wide-angle scheme proceeds.

The zoom lens according to each example may further satisfy the following conditional expression (5):

$$0.8 < f2/fw < 4.0 \quad (5)$$

where f2 is a focal length of the second lens unit L2.

The conditional expression (5) defines a relationship between the focal length f2 of the second lens unit L2 and the focal length fw of the zoom lens at the wide-angle end, in order to reduce the lens diameter and to realize a high optical performance in the overall zoom range.

If the focal length f2 of the second lens unit L2 becomes longer and the value becomes higher than the upper limit in the conditional expression (5), it becomes difficult to sufficiently reduce the lens diameter of the subsequent lens units. If the focal length fw of the zoom lens at the wide-angle end is longer and the value becomes higher than the upper limit in the conditional expression (5), the front lens diameter becomes large due to the wide-angle scheme.

When the focal length f2 of the second lens unit L2 becomes shorter and the value is lower than the lower limit in the conditional expression (5), it is advantageous for the reduced lens diameter but it becomes difficult to sufficiently correct the spherical aberration generated in the second lens unit L2. If the focal length fw of the zoom lens at the wide-angle end becomes longer and the value becomes lower than the lower limit in the conditional expression (5), a desired angle of view cannot be obtained at the wide-angle end.

The zoom lens according to each example may further satisfy the following conditional expression (6):

$$0.3 < |fr|/fw < 20.0 \quad (6)$$

where fr is a focal length of the lens unit (final lens unit) closest to the image plane.

The conditional expression (6) defines a relationship between the focal length fr of the final lens unit and the focal length fw of the zoom lens at the wide-angle end, in order to properly correct the curvature of field and to properly set the light incident angle on the image plane.

If the focal length fr of the final lens unit becomes longer and the value becomes higher than the upper limit in the conditional expression (6), the refractive power of the final lens unit becomes too weak, and it becomes difficult to provide a sufficient curvature of field aberration effect. Further, it is necessary to secure a space for disposing a lens unit having no refractive power, and the miniaturization may be hindered. Moreover, if the focal length fw of the zoom lens at the wide-angle end is longer and the value becomes higher than the upper limit in the conditional expression (6), the front lens diameter becomes large due to the wide-angle scheme.

If the focal length fr of the final lens unit becomes shorter and the value becomes lower than the lower limit in the conditional expression (6), the effect of reducing the overall lens length becomes stronger, but the absolute value of the light incident angle on the image plane becomes too large and shading generated in the image sensor tends to be large. Further, the curvature of field correction effect in the final lens unit becomes excessive.

The zoom lens according to each example may further satisfy the following conditional expression (7):

$$0.5 < POw/fw < 3.0 \quad (7)$$

where POw is a distance from the image plane to the exit pupil position at the wide-angle end. The sign of the distance from the image plane to the exit pupil position is negative when the exit pupil position is located on the object side of the image plane and positive when it is located on the image side of the image plane.

The conditional expression (7) defines a relationship between the distance POw from the image plane to the exit pupil position at the wide-angle end and the focal length fw of the zoom lens at the wide-angle end, in order to secure a high telecentricity, to properly correct the curvature of field, and to properly set the light incident angle on the image plane.

If the distance POw from the image plane to the exit pupil position at the wide-angle end becomes shorter and the value becomes higher than the upper limit in the conditional expression (7), the light incident angle on the image plane at the peripheral image height becomes too high and may cause so-called shading. If the focal length fw of the zoom lens at the wide-angle end is shorter and the value becomes higher than the upper limit in the conditional expression (7), it becomes difficult to achieve a desired zoom magnification.

When the distance POw from the image plane to the exit pupil position at the wide-angle end becomes longer and the value becomes lower than the lower limit in the conditional expression (7), the refractive power of the final lens unit tends to increase, and it becomes difficult to sufficiently suppress the curvature of field.

The zoom lens according to each example may further satisfy the following conditional expression (8) wherein first lens unit L1 includes a negative lens closest to the object:

$$-3.0 < (R2+R1)/(R2-R1) < -0.3 \quad (8)$$

where R1 is a radius of curvature of the negative lens on the object side, and R2 is a radius of curvature of the negative lens on the image side.

The conditional expression (8) defines a shape of the negative lens closest to the object in the first lens unit L1 or a so-called shape factor of the negative lens, in order to achieve both a short lens diameter of the front lens and suppressed distortion.

If the biconcave shape of the negative lens becomes stronger and the value becomes higher than the upper limit in the conditional expression (8), a radius of curvature R1 on the object side becomes too strong and the distortion becomes too strong. Further, when the biconcave shape becomes stronger, the refractive power of the negative lens also becomes stronger, and it becomes difficult to suppress the lateral chromatic aberration and curvature of field at the wide-angle end.

If the shape factor of the negative lens becomes negatively larger and the value becomes lower than the lower limit in the conditional expression (8), the negative meniscus shape becomes too strong in which the lens shape is convex toward the object. If the negative meniscus shape becomes too strong, it is advantageous for suppressing the distortion, but the overall thickness of the first lens unit L1 increases and the diameter of the mechanical member at the tip of the zoom lens increases and prevents the miniaturization.

The zoom lens according to each example may further satisfy the following conditional expression (9):

$$0.2 < m2/fw < 1.4 \quad (9)$$

where m2 is a moving amount of the second lens unit L2 during zooming from the wide-angle end to the telephoto end.

The conditional expression (9) defines a relationship between the zoom moving amount m2 of the second lens unit L2 and the focal length of the zoom lens at the wide-angle end, in order to determine a proper zoom moving amount of the second lens unit L2.

If the zoom moving amount m2 of the second lens unit L2 becomes larger and the value becomes higher than the upper limit in the conditional expression (9), it becomes difficult to reduce the overall lens length at the telephoto end. Further, as the zoom moving amount m2 becomes larger, a ratio change of a vertical width of the luminous flux between the wide-angle end and the telephoto end becomes large. As a result, a decrease of a peripheral light amount generated when the luminous flux is narrowed by the diaphragm becomes remarkable. Further, if the focal length fw of the zoom lens at the wide-angle end is shorter and the value becomes higher than the upper limit in the conditional expression (9), the front lens diameter becomes larger due to the wide-angle scheme.

When the zoom moving amount m2 of the second lens unit L2 becomes smaller and the value becomes lower than the lower limit in the conditional expression (9), it is necessary to extend the focal length f2 of the second lens unit L2 which is a main magnification varying lens unit, and it consequently becomes difficult to suppress the spherical aberration generated at the telephoto end. If the focal length fw of the zoom lens at the wide-angle end becomes longer and the value becomes lower than the lower limit in the conditional expression (9), the desired zoom ratio cannot be achieved.

The zoom lens may further satisfy the following conditional expression (10):

$$-3.0 < fg1/fw < -0.5 \quad (10)$$

where fg1 is a focal length of a lens closest to the object in the zoom lens.

The conditional expression (10) defines a relationship between the focal length fg1 of the lens closest to the object in the zoom lens and the focal length fw of the zoom lens at the wide-angle end, in order to achieve both a good optical performance and the miniaturization at the wide-angle end.

If the focal length fg1 of the lens closest to the object in the zoom lens is shorter and the value becomes higher than the upper limit in the conditional expression (10), the retrofocus arrangement becomes strong, which is advantageous for reducing the overall lens length at the wide-angle end but the distortion cannot be sufficiently suppressed. Further, if the focal length fw of the zoom lens at the wide-angle end becomes longer and the value becomes higher than the upper limit in the conditional expression (10), a desired angle of view at the wide-angle end cannot be obtained.

If the focal length fg1 of the lens closest to the object in the zoom lens is longer and the value becomes lower than the lower limit in the conditional expression (10), the retrofocus arrangement at the wide-angle end becomes weaker and may increase the overall lens length and the front lens diameter. If the focal length fw of the zoom lens at the wide-angle end is shorter and the value becomes lower than the lower limit in the conditional expression (10), the front lens diameter becomes larger due to the wide-angle scheme.

The zoom lens may further satisfy the following conditional expression (11):

$$3.5 < TTDw/skw < 22.0 \quad (11)$$

where TTDw is an overall lens length at the wide-angle end.

The conditional expression (11) defines a relationship between the overall lens length TTDw and the backfocus skw at the wide-angle end in order to obtain a zoom lens with a small overall lens length.

If the overall lens length TTDw at the wide-angle end increases and the value becomes higher than the upper limit in the conditional expression (11), a reduced overall lens length cannot be met. Further, if the backfocus ski becomes smaller and the value becomes higher than the upper limit in the conditional expression (11), the mechanical layout of the connector between the lens and the camera becomes difficult.

If the overall lens length at the wide-angle end becomes smaller and the value becomes lower than the lower limit in the conditional expression (11), the positive refractive power of the entire lens becomes too high, and it becomes difficult to control the Petzval sum and to obtain the desired optical performance. Further, if the backfocus skew becomes larger and the value becomes lower than the lower limit in the conditional expression (11), it becomes difficult to reduce the overall lens length.

The numerical ranges of the conditional expressions (1) to (11) may be the numerical ranges of the following conditional expressions (1a) to (11a):

$$4.9 < m1 \cdot f1/skw^2 < 14.0 \quad (1a)$$

$$2.50 < \beta2t/\beta2w < 30.00 \quad (2a)$$

$$0.08 < TD1/ft < 0.40 \quad (3a)$$

$$-3.0 < f1/fw < -1.2 \quad (4a)$$

$$1.0 < f2/fw < 3.0 \quad (5a)$$

$$0.5 < |fr|/fw < 16.0 \quad (6a)$$

$$0.6 < POw/fw < 2.0 \quad (7a)$$

$$-2.0 < (R2+R1)/(R2-R1) < -0.5 \quad (8a)$$

$$0.3 < m2/fw < 1.0 \quad (9a)$$

$$-2.0 < fg1/fw < -0.8 \quad (10a)$$

$$4.0 < TTDw/skw < 20.0 \quad (11a)$$

The numerical ranges of the conditional expressions (1) to (11) may be the numerical ranges of the following conditional expressions (1b) to (11b):

$$4.9 < m1 \cdot f1/skw^2 < 13.0 \quad (1b)$$

$$2.50 < \beta2t/\beta2w < 25.00 \quad (2b)$$

$$0.11 < TD1/ft < 0.30 \quad (3b)$$

$$-2.5 < f1/fw < -1.5 \quad (4b)$$

$$1.3 < f2/fw < 2.8 \quad (5b)$$

$$0.7 < |fr|/fw < 14.0 \quad (6b)$$

$$0.8 < POw/fw < 1.7 \quad (7b)$$

$$-1.2 < (R2+R1)/(R2-R1) < -0.7 \quad (8b)$$

$$0.4 < m2/fw < 0.9 \quad (9b)$$

$$-1.7 < fg1/fw < -1.1 \quad (10b)$$

$$6.0 < TTDw/skw < 17.0 \quad (11b)$$

In order to reduce the weight of the first lens unit L1, the number of lenses in the first lens unit L1 may be two or less. Further, the first lens unit L1 may have two lenses having negative and positive refractive powers arranged from the object side to the image side, in order to correct the chromatic aberration.

In order to perform light weight and quick focusing, focusing may be performed on the image side of the second lens unit L2. In order to suppress the fluctuation of the curvature of field due to focusing, the third lens unit L3 may be moved during focusing.

A so-called floating configuration may be used that moves two or more lens units in order to suppress the fluctuations of the spherical aberration and curvature of field during focusing.

Next follows a detailed description of the optical system according to each example.

The zoom lens according to Example 1 is a six-unit zoom lens that includes, in order from the object side to the image side, a first lens unit L1 having a negative refractive power, a second lens unit L2 having a positive refractive power, a third lens unit L3 having a negative refractive power, a fourth lens unit L4 having a positive refractive power, a fifth lens unit L5 having a negative refractive power, and a sixth lens unit L6 having a positive refractive power. The zoom lens according to Example 1 is a zoom lens having a zoom ratio of 2.4 and an F-number of 2.9. During zooming from the wide-angle end to the telephoto end, the first lens unit L1 monotonically moves to the image side, and the second lens unit L2 to the sixth lens unit L6 move to the object side. During zooming, the second lens unit L2 and the fourth lens unit L4 move integrally (with the same trajectory) toward the object side. During focusing, the third lens unit L3 and the fifth lens unit L5 move.

The zoom lens according to Example 2 is a six-unit zoom lens that includes, in order from the object side to the image side, a first lens unit L1 having a negative refractive power, a second lens unit L2 having a positive refractive power, a third lens unit L3 having a positive refractive power, a fourth lens unit L4 having a positive refractive power, a fifth lens unit L5 having a negative refractive power, and a sixth lens unit L6 having a negative refractive power. The zoom lens according to Example 2 is a zoom lens having a zoom ratio of 2.4 and an F-number of 2.9. During zooming from the wide-angle end to the telephoto end, the first lens unit L1 monotonically moves to the image side, and the second lens unit L2 to the sixth lens unit L6 move to the object side. During zooming, the second lens unit L2 and the fourth lens unit L4 move integrally (with the same trajectory) toward the object side. During focusing, the third lens unit L3 and the fifth lens unit L5 move.

The zoom lens according to Example 3 is a five-unit zoom lens that includes, in order from the object side to the image side, a first lens unit L1 having a negative refractive power, a second lens unit L2 having a positive refractive power, a third lens unit L3 having a positive refractive power, a fourth lens unit L4 having a negative refractive power, and a fifth lens unit L5 having a positive refractive power. The zoom lens according to Example 3 is a zoom lens having a zoom ratio of 2.1 and an F-number of 4.12. During zooming from the wide-angle end to the telephoto end, the first lens unit L1 monotonically moves to the image side, and the second lens unit L2 to the fifth lens unit L5 move to the object side. During focusing, the fourth lens unit L4 moves.

The zoom lenses according to Example 4 is a five-unit zoom lens that includes, in order from the object side to the image side, a first lens unit L1 having a negative refractive power, a second lens unit L2 having a positive refractive power, a third lens unit L3 having a positive refractive power, a fourth lens unit L4 having a negative refractive power, and a fifth lens unit L5 having a negative refractive power. The zoom lens according to Example 4 is a zoom lens having a zoom ratio of 2.4 and an F-number of 2.9. During zooming from the wide-angle end to the telephoto end, the first lens unit L1 monotonically moves to the image side, and the second lens unit L2 to the fifth lens unit L5 move to the object side. During focusing, the second lens unit L2 and the fourth lens unit L4 move.

The zoom lens according to Example 5 is a six-unit zoom lens that includes, in order from the object side to the image side, a first lens unit L1 having a negative refractive power, a second lens unit L2 having a positive refractive power, a third lens unit L3 having a negative refractive power, a fourth lens unit L4 having a positive refractive power, a fifth lens unit L5 having a negative refractive power, and a sixth lens unit L6 having a positive refractive power. The zoom lens according to Example 5 is a zoom lens having a zoom ratio of 2.4 and an F-number of 2.9. During zooming from the wide-angle end to the telephoto end, the first lens unit L1 monotonically moves to the image side, and the second lens unit L2 to the fifth lens unit L5 move to the object side. During focusing, the third lens unit L3 and the fifth lens unit L5 move.

Numerical examples 1 to 5 corresponding to Examples 1 to 5 will be shown below.

In the surface data according to each numerical example, r represents a radius of curvature of each optical surface, and d (mm) represents an axial distance (distance on the optical axis) between an m-th plane and an (m+1)-th plane, where m is the surface number counted from the light incident side. nd represents a refractive index of each optical element for the d-line, and vd represents an Abbe number of the optical element. An Abbe number vd of a certain material is expressed as vd=(Nd−1)/(NF−NC) where Nd, NF, and NC are refractive indexes for the d-line (587.6 nm), F-line (486.1 nm), and C-line (656.3 nm) in the Fraunhofer line.

In each numerical example, a value of each of d, focal length (mm), F-number, and half angle of view (degrees) is set when the zoom lens according to each example focuses on the infinity object. A "backfocus" is a distance on the optical axis from the final surface of the lens (closest to the image plane) to the paraxial image plane in terms of the air equivalent length. An "overall lens length" is a length obtained by adding the backfocus to a distance on the optical axis from the frontmost surface (closest to the object) to the final surface in the zoom lens. The "lens unit" may include one or more lenses.

If the optical surface is an aspherical surface, an asterisk * is attached to the right side of the surface number. The aspherical shape is expressed as follows:

$$X=(h^2/R)/[1+\{1-(1+k)(h/R)^2\}^{1/2}+A4\times h^4+A6\times h^6+A8\times h^8+A10\times h^{10}+A12\times h^{12}$$

where X is a displacement amount from a surface apex in the optical axis direction, h is a height from the optical axis in the direction orthogonal to the optical axis, R is a paraxial radius of curvature, k is a conical constant, A4, A6, A8, A10, and A12 are the aspherical coefficients.

"e±XX" in each aspheric al coefficient means "x10$^{\pm XX}$."

Numerical Example 1

| UNIT: mm | | | | |
|---|---|---|---|---|
| Surface data | | | | |
| Surface number | r | d | nd | vd |
| 1 | −428.142 | 1.75 | 1.80400 | 46.6 |
| 2 | 37.754 | 9.55 | | |
| 3 | 59.622 | 2.67 | 1.98612 | 16.5 |
| 4 | 87.357 | (variable) | | |
| 5 | 56.402 | 1.00 | 1.68893 | 31.1 |
| 6 | 28.330 | 7.81 | 1.72916 | 54.7 |
| 7 | −95.065 | 0.14 | | |
| 8 | 29.059 | 1.84 | 1.49700 | 81.5 |
| 9 | 32.935 | (variable) | | |
| 10 | −45.321 | 1.00 | 1.63636 | 35.4 |
| 11 | 592.135 | (variable) | | |
| 12 | 37.952 | 5.49 | 2.00069 | 25.5 |
| 13 | −136.791 | 0.50 | | |
| 14 (diaphragm) | ∞ | 2.58 | | |
| 15 | −69.090 | 1.15 | 1.85478 | 24.8 |
| 16 | 21.060 | 6.30 | 1.49700 | 81.5 |
| 17 | −66.549 | 0.15 | | |
| 18 | 50.733 | 2.72 | 1.72916 | 54.7 |
| 19 | −180.626 | (variable) | | |
| 20 | −66.439 | 0.95 | 1.60342 | 38.0 |
| 21 | 41.895 | (variable) | | |
| 22* | −84.730 | 2.30 | 1.53110 | 55.9 |
| 23* | −10000.000 | 0.15 | | |
| 24 | 243.149 | 2.87 | 1.95906 | 17.5 |
| 25 | −108.768 | (variable) | | |
| Image plane | ∞ | | | |

| ASPHERIC DATA | |
|---|---|
| 22nd surface | |
| K = 0.00000e+000 | A 4 = −1.08643e-004 |
| A 6 = 2.64276e-007 | A8 = 5.41174e-011 |
| A10 = −9.69154e-012 | A12 = 3.59323e-014 |
| 23rd surface | |
| K = 0.00000e+000 | A 4 = −9.39877e-005 |
| A 6 = 3.27521e-007 | A 8 = −8.60542e-010 |
| A10 = −9.96928e-014 | A12 = 4.99140e-015 |

| VARIOUS DATA | | | |
|---|---|---|---|
| Zoom ratio | 2.35 | | |
| | Wide-angle | Middle | Telephoto |
| Focal length | 28.84 | 39.89 | 67.90 |
| Fno | 2.91 | 2.91 | 2.91 |
| Half angle of view (°) | 32.65 | 28.06 | 17.67 |
| Image height | 21.64 | 21.64 | 21.64 |
| Overall lens length | 149.46 | 133.18 | 115.94 |
| BF | 13.48 | 19.38 | 27.78 |
| d4 | 54.82 | 31.15 | 0.78 |
| d9 | 8.83 | 10.86 | 14.92 |
| d11 | 7.07 | 5.04 | 0.98 |
| d19 | 2.19 | 1.51 | 4.80 |
| d21 | 12.14 | 14.31 | 15.75 |
| d25 | 13.48 | 19.38 | 27.78 |

| ZOOM LENS UNIT DATA | | |
|---|---|---|
| Unit | Starting surface | Focal length |
| 1 | 1 | −59.41 |
| 2 | 5 | 42.89 |

-continued

UNIT: mm

| 3 | 10 | -66.11 |
| 4 | 12 | 34.55 |
| 5 | 20 | -42.44 |
| 6 | 22 | 149.07 |

Numerical Example 2

UNIT: mm

Surface data

| Surface number | r | d | nd | vd |
|---|---|---|---|---|
| 1 | -531.035 | 1.75 | 1.77250 | 49.6 |
| 2 | 37.215 | 8.97 | | |
| 3 | 55.848 | 2.67 | 1.92286 | 18.9 |
| 4 | 75.855 | (variable) | | |
| 5 | 48.808 | 3.20 | 1.91082 | 35.3 |
| 6 | 215.861 | (variable) | | |
| 7 | 834.033 | 2.75 | 1.59349 | 67.0 |
| 8 | -76.184 | (variable) | | |
| 9 | 42.644 | 6.59 | 1.49700 | 81.5 |
| 10 | -32.646 | 1.15 | 1.85478 | 24.8 |
| 11 | 9510.014 | 4.24 | | |
| 12 (diaphragm) | ∞ | 3.41 | | |
| 13 | -30.593 | 1.15 | 1.59551 | 39.2 |
| 14 | 26.646 | 7.19 | 1.49700 | 81.5 |
| 15 | -42.944 | 0.15 | | |
| 16 | 173.357 | 3.42 | 2.00100 | 29.1 |
| 17 | -48.634 | (variable) | | |
| 18 | 9944.835 | 0.75 | 1.80610 | 33.3 |
| 19 | 57.905 | (variable) | | |
| 20* | -32.063 | 2.00 | 1.53110 | 55.9 |
| 21* | -348.660 | 0.15 | | |
| 22 | 161.070 | 2.41 | 1.92286 | 20.9 |
| 23 | -200.000 | (variable) | | |
| Image plane | ∞ | | | |

ASPHERIC DATA

20th surface

K = 0.00000e+000     A 4 = -1.19984e-004
A 6 = 9.66918e-007   A 8 = -6.32003e-009
A10 = 2.49515e-011   A12 = -3.98821e-014

21st surface

K = 0.00000e+000     A 4 = -9.93325e-005
A 6 = 8.27469e-007   A 8 = -4.58548e-009
A10 = 1.54002e-011   A12 = -2.18663e-014

VARIOUS DATA

| Zoom ratio | 2.35 | | |
|---|---|---|---|
| | Wide-angle | Middle | Telephoto |
| Focal length | 28.84 | 39.96 | 67.90 |
| Fno | 2.91 | 2.91 | 2.91 |
| Half angle of view (°) | 32.68 | 27.27 | 17.67 |
| Image height | 18.50 | 20.60 | 21.64 |
| Overall lens length | 152.91 | 136.27 | 115.98 |
| BF | 13.50 | 19.41 | 26.94 |
| d4 | 57.92 | 33.76 | 0.90 |
| d 6 | 8.29 | 6.33 | 1.87 |
| d 8 | 3.90 | 5.86 | 10.33 |
| d17 | 2.47 | 1.63 | 6.57 |
| d19 | 14.87 | 17.32 | 17.42 |
| d23 | 13.50 | 19.41 | 26.94 |

-continued

UNIT: mm

ZOOM LENS UNIT DATA

| Unit | Starting surface | Focal length |
|---|---|---|
| 1 | 1 | -58.66 |
| 2 | 5 | 68.62 |
| 3 | 7 | 117.75 |
| 4 | 9 | 51.72 |
| 5 | 18 | -72.26 |
| 6 | 20 | -229.14 |

Numerical Example 3

UNIT: mm

Surface data

| Surface number | r | d | nd | vd |
|---|---|---|---|---|
| 1 | -1261.978 | 1.75 | 1.83481 | 42.7 |
| 2 | 29.403 | 8.02 | | |
| 3 | 33.753 | 3.48 | 1.92286 | 20.9 |
| 4 | 47.518 | (variable) | | |
| 5 | 435.648 | 1.30 | 1.84666 | 23.8 |
| 6 | 88.348 | 2.28 | 1.88300 | 40.8 |
| 7 | -113.328 | 0.96 | | |
| 8 | 44.314 | 2.01 | 1.77250 | 49.6 |
| 9 | 193.879 | 1.64 | | |
| 10 | 77.542 | 3.32 | 1.49700 | 81.5 |
| 11 | -42.143 | 1.15 | 1.74400 | 44.8 |
| 12 | 133.916 | (variable) | | |
| 13 (diaphragm) | ∞ | 0.76 | | |
| 14 | 33.973 | 1.15 | 1.63980 | 34.5 |
| 15 | 14.530 | 6.17 | 1.49700 | 81.5 |
| 16 | -405.427 | 0.15 | | |
| 17 | 52.432 | 2.78 | 2.00100 | 29.1 |
| 18 | 299.093 | (variable) | | |
| 19 | 37.718 | 0.75 | 1.54814 | 45.8 |
| 20 | 13.807 | (variable) | | |
| 21* | -27.130 | 2.30 | 1.53110 | 55.9 |
| 22* | -24.677 | 0.15 | | |
| 23 | ∞ | 1.00 | 1.51633 | 64.1 |
| 24 | ∞ | (variable) | | |
| Image plane | ∞ | | | |

ASPHERIC DATA

21st surface

K = 0.00000e+000     A 4 = 1.79444e-005
A 6 = 6.83669e-007   A 8 = -4.55763e-009
A10 = 2.51149e-011   A12 = -4.71818e-014

22nd surface

K = 0.00000e+000     A 4 = 1.15444e-005
A 6 = 3.82825e-007   A 8 = -1.42844e-009
A10 = 1.85804e-012   A12 = 2.26883e-014

VARIOUS DATA

| Zoom ratio | 2.08 | | |
|---|---|---|---|
| | Wide-angle | Middle | Telephoto |
| Focal length | 28.84 | 33.20 | 60.00 |
| Fno | 4.12 | 4.12 | 4.12 |
| Half angle of view (°) | 32.68 | 31.82 | 19.83 |
| Image height | 18.50 | 20.60 | 21.64 |
| Overall lens length | 141.33 | 130.27 | 104.61 |
| BF | 19.70 | 21.65 | 35.51 |
| d4 | 51.44 | 38.63 | 3.10 |
| d12 | 12.65 | 12.07 | 6.20 |

-continued

| UNIT: mm | | | |
|---|---|---|---|
| d18 | 0.99 | 1.93 | 5.63 |
| d20 | 15.44 | 14.88 | 13.06 |
| d24 | 19.70 | 21.65 | 35.51 |

ZOOM LENS UNIT DATA

| Unit | Starting surface | Focal length |
|---|---|---|
| 1 | 1 | −52.26 |
| 2 | 5 | 50.66 |
| 3 | 13 | 39.45 |
| 4 | 19 | −40.18 |
| 5 | 21 | 387.83 |

Numerical Example 4

| UNIT: mm | | | |
|---|---|---|---|

Surface data

| Surface number | r | d | nd | vd |
|---|---|---|---|---|
| 1 | −143.018 | 1.75 | 1.77250 | 49.6 |
| 2 | 32.312 | 2.16 | | |
| 3 | 35.717 | 4.55 | 1.84666 | 23.8 |
| 4 | 60.204 | (variable) | | |
| 5 | 48.911 | 4.77 | 1.54072 | 47.2 |
| 6 | −68.431 | (variable) | | |
| 7 | 30.129 | 8.11 | 1.59522 | 67.7 |
| 8 | −35.015 | 1.15 | 2.00100 | 29.1 |
| 9 | 219.719 | 5.51 | | |
| 10 (diaphragm) | ∞ | 4.78 | | |
| 11 | −101.380 | 1.15 | 1.58267 | 46.4 |
| 12 | 16.750 | 9.31 | 1.49700 | 81.5 |
| 13 | −44.210 | 5.92 | | |
| 14 | 35.210 | 4.38 | 1.85026 | 32.3 |
| 15 | −59.704 | (variable) | | |
| 16 | −515.642 | 0.75 | 1.77250 | 49.6 |
| 17 | 61.351 | (variable) | | |
| 18* | −18.970 | 1.70 | 1.90525 | 35.0 |
| 19* | −107.214 | (variable) | | |
| Image plane | ∞ | | | |

ASPHERIC DATA

18th surface

K = 0.00000e+000    A 4 = −5.66177e−005
A 6 = 1.43126e−006    A 8 = −1.27451e−008
A10 = 6.21456e−011    A12 = −1.22837e−013

19th surface

K = 0.00000e+000    A 4 = −4.89520e−005
A 6 = 1.04997e−006    A 8 = −8.61280e−009
A10 = 3.71921e−011    A12 = −6.60608e−014

VARIOUS DATA

| Zoom ratio | 2.35 | | |
|---|---|---|---|
| | Wide-angle | Middle | Telephoto |
| Focal length | 28.84 | 37.16 | 67.90 |
| Fno | 2.91 | 2.91 | 2.91 |
| Half angle of view (°) | 32.68 | 29.00 | 17.67 |
| Image height | 18.50 | 20.60 | 21.64 |
| Overall lens length | 121.04 | 110.42 | 101.92 |
| BF | 9.97 | 13.25 | 25.53 |
| d4 | 39.54 | 24.18 | 0.87 |
| d6 | 7.16 | 7.52 | 6.80 |

-continued

| UNIT: mm | | | |
|---|---|---|---|
| d15 | 1.18 | 1.48 | 1.15 |
| d17 | 7.19 | 7.99 | 11.56 |
| d19 | 9.97 | 13.25 | 25.53 |

ZOOM LENS UNIT DATA

| Unit | Starting surface | Focal length |
|---|---|---|
| 1 | 1 | −51.89 |
| 2 | 5 | 53.52 |
| 3 | 7 | 27.17 |
| 4 | 16 | −70.93 |
| 5 | 18 | −25.70 |

Numerical Example 5

| UNIT: mm | | | |
|---|---|---|---|

Surface data

| Surface number | r | d | nd | vd |
|---|---|---|---|---|
| 1 | −670.741 | 1.75 | 1.80400 | 46.6 |
| 2 | 37.100 | 9.98 | | |
| 3 | 57.526 | 2.56 | 1.98612 | 16.5 |
| 4 | 80.942 | (variable) | | |
| 5 | 55.761 | 1.00 | 1.68893 | 31.1 |
| 6 | 31.691 | 7.27 | 1.72916 | 54.7 |
| 7 | −89.018 | 0.12 | | |
| 8 | 28.507 | 1.87 | 1.49700 | 81.5 |
| 9 | 32.548 | (variable) | | |
| 10 | −45.683 | 1.00 | 1.63636 | 35.4 |
| 11 | 193.361 | (variable) | | |
| 12 | 35.340 | 5.48 | 2.00069 | 25.5 |
| 13 | −236.182 | 0.49 | | |
| 14 (diaphragm) | ∞ | 2.34 | | |
| 15 | −104.119 | 1.15 | 1.85478 | 24.8 |
| 16 | 19.312 | 6.73 | 1.49700 | 81.5 |
| 17 | −66.325 | 0.15 | | |
| 18 | 42.684 | 2.91 | 1.72916 | 54.7 |
| 19 | −223.150 | (variable) | | |
| 20 | −64.630 | 0.95 | 1.60342 | 38.0 |
| 21 | 35.092 | (variable) | | |
| 22* | −93.365 | 2.30 | 1.53110 | 55.9 |
| 23* | −10000.000 | 0.15 | | |
| 24 | 155.537 | 3.00 | 1.95906 | 17.5 |
| 25 | −135.592 | (variable) | | |
| Image plane | ∞ | | | |

ASPHERIC DATA

22nd surface

K = 0.00000e+000    A 4 = −1.03705e−004
A 6 = 1.85435e−007    A 8 = 3.55118e−010
A10 = −1.06687e−011    A12 = 3.80401e−014

23rd surface

K = 0.00000e+000    A 4 = −9.10151e−005
A 6 = 2.50480e−007    A 8 = −4.89160e−010
A10 = −1.47203e−012    A12 = 7.39486e−015

VARIOUS DATA

| Zoom ratio | 2.35 | | |
|---|---|---|---|
| | Wide-angle | Middle | Telephoto |
| Focal length | 28.84 | 39.87 | 67.90 |
| Fno | 2.91 | 2.91 | 2.91 |
| Half angle of view (°) | 32.65 | 28.07 | 17.67 |
| Image height | 21.64 | 21.64 | 21.64 |

-continued

UNIT: mm

| Overall lens length | 146.19 | 132.32 | 116.42 |
|---|---|---|---|
| BF | 14.84 | 20.01 | 28.77 |
| d4 | 51.62 | 30.19 | 0.78 |
| d9 | 8.53 | 10.73 | 14.84 |
| d11 | 7.27 | 5.07 | 0.95 |
| d19 | 2.66 | 1.59 | 3.99 |
| d21 | 10.08 | 13.54 | 15.88 |
| d25 | 14.84 | 20.01 | 28.77 |

ZOOM LENS UNIT DATA

| Unit | Starting surface | Focal length |
|---|---|---|
| 1 | 1 | −59.43 |
| 2 | 5 | 41.65 |
| 3 | 10 | −57.97 |
| 4 | 12 | 31.75 |
| 5 | 20 | −37.56 |
| 6 | 22 | 129.49 |

Table 1 summarizes various values in each numerical example.

| | Conditional expression | Ex. 1 | Ex. 2 | Ex. 3 | Ex. 4 | Ex. 5 |
|---|---|---|---|---|---|---|
| (1) | $4.8 < m1 \cdot f1/skw^2 < 15.0$ | 10.954 | 11.893 | 4.945 | 9.986 | 8.034 |
| (2) | $2.45 < \beta 2t/\beta 2w < 50.0$ | 2.673 | 24.411 | 3.978 | 9.294 | 2.505 |
| (3) | $0.05 < TD1/ft < 0.5$ | 0.206 | 0.197 | 0.221 | 0.125 | 0.210 |
| (4) | $-4.0 < f1/fw < -1.0$ | −2.060 | −2.034 | −1.812 | −1.799 | −2.061 |
| (5) | $0.8 < f2/fw < 4.0$ | 1.487 | 2.379 | 1.757 | 1.855 | 1.444 |
| (6) | $0.3 < |fr|/fw < 20$ | 5.169 | 7.945 | 13.447 | 0.891 | 4.490 |
| (7) | $0.5 < POw/fw < 3.0$ | 1.569 | 1.521 | 1.664 | 0.952 | 1.539 |
| (8) | $-3.0 < (R2 + R1)/(R2 - R1) < -0.3$ | −0.838 | −0.869 | −0.954 | −0.631 | −0.895 |
| (9) | $0.2 < m2/fw < 1.4$ | 0.711 | 0.697 | 0.403 | 0.678 | 0.730 |
| (10) | $-3.0 < fg1/fw < -0.5$ | −1.494 | −1.559 | −1.193 | −1.178 | −1.514 |
| (11) | $3.5 < TTDw/skw < 22.0$ | 11.085 | 11.331 | 7.174 | 12.145 | 9.851 |
| | f1 | −59.409 | −58.656 | −52.256 | −51.890 | −59.435 |
| | f2 | 42.895 | 68.616 | 50.660 | 53.515 | 41.646 |
| | f3 | −66.115 | 117.754 | 39.448 | 27.170 | −57.975 |
| | f4 | 34.546 | 51.717 | −40.181 | −70.934 | 31.745 |
| | f5 | −42.440 | −72.257 | 387.825 | −25.695 | −37.556 |
| | f6 | 149.073 | −229.136 | — | — | 129.494 |
| | fw | 28.841 | 28.840 | 28.840 | 28.841 | 28.842 |
| | ft | 67.900 | 67.900 | 60.000 | 67.899 | 67.899 |
| | β2w | −0.497 | −1.154 | −0.785 | −1.235 | −0.492 |
| | β2t | −1.328 | −28.172 | −3.121 | −11.479 | −1.233 |
| | skw | 13.484 | 13.495 | 19.700 | 9.966 | 14.840 |
| | m1 | −33.523 | −36.929 | −36.722 | −19.115 | −29.771 |
| | m2 | 20.513 | 20.092 | 11.615 | 19.552 | 21.065 |
| | POw | 45.237 | 43.871 | 47.976 | 27.453 | 44.399 |
| | TTDw | 149.462 | 152.912 | 141.331 | 121.040 | 146.186 |
| | TD1 | 13.969 | 13.388 | 13.253 | 8.464 | 14.289 |
| | R1 | −428.142 | −531.035 | −1261.978 | −143.018 | −670.741 |
| | R2 | 37.754 | 37.215 | 29.403 | 32.312 | 37.100 |
| | fg1 | −43.080 | −44.959 | −34.398 | −33.972 | −43.678 |

Image Pickup Apparatus

Figure 11:
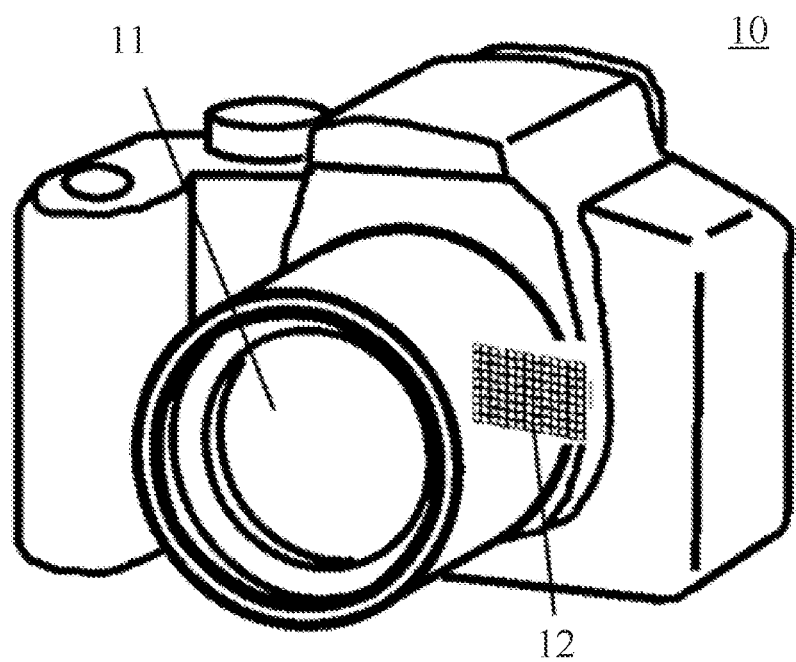
FIG. 11 is a schematic view of an image pickup apparatus.

Referring now to FIG. 11, a description will be given of an illustrative digital still camera (image pickup apparatus) using the zoom lens according to the present invention as an image pickup optical system. In FIG. 11, reference numeral 10 denotes a camera body, and reference numeral 11 denotes an imaging optical system that includes any one of the zoom lenses according to Examples 1 to 5. Reference numeral 12 denotes a solid-state image sensor (photoelectric conversion element) such as a CCD sensor and a CMOS sensor, which is built in the camera body 11 and configured to receive an optical image formed by the imaging optical system 11 and to perform a photoelectric conversion. The camera body 10 may be a so-called single-lens reflex camera having a quick turn mirror, or a so-called mirrorless camera having no quick turn mirror.

By applying the zoom lens according to each example to an image pickup apparatus such as a digital still camera in this way, the image pickup apparatus can have a small lens.

Each example can provide a compact zoom lens having a large aperture ratio and a high optical performance, and an image pickup apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-085406, filed on May 14, 2020, which is hereby incorporated by reference herein in its entirety.

What is claimed is:

1. A zoom lens comprising, in order from an object side to an image side, a first lens unit having a negative refractive power, a second lens unit having a positive refractive power, and three or more lens units, wherein a distance between adjacent lens units varies during zooming, and wherein the following conditional expressions are satisfied:

$$4.8 < m1 \cdot f1/skw^2 < 15.0$$

$$2.45 < \beta 2t/\beta 2w < 50.00$$

where m1 is a moving amount of the first lens unit during zooming from a wide-angle end to a telephoto end, f1 is a focal length of the first lens unit, skw is a backfocus at the wide-angle end, β2t is a lateral magnification of the second lens unit at the telephoto end, and β2w is a lateral magnification of the second lens unit at the wide-angle end.

2. The zoom lens according to claim 1, wherein the following conditional expression is satisfied:

$$0.05 < TD1/ft < 0.50$$

where TD1 is a distance on an optical axis from a lens surface closest to an object to a lens surface closest to an image plane in the first lens unit, and ft is a focal length of the zoom lens at the telephoto end.

3. The zoom lens according to claim 1, wherein the following conditional expression is satisfied:

$$-4.0 < f1/fw < -1.0$$

where fw is a focal length of the zoom lens at the wide-angle end.

4. The zoom lens according to claim 1, wherein the following conditional expression is satisfied:

$$0.8 < f2/fw < 4.0$$

where f2 is a focal length of the second lens unit, and fw is a focal length of the zoom lens at the wide-angle end.

5. The zoom lens according to claim 1, wherein the following conditional expression is satisfied:

$$0.3 < |fr|/fw < 20.0$$

where fr is a focal length of a lens unit closest to an image plane, fw is a focal length of the zoom lens at the wide-angle end.

6. The zoom lens according to claim 1, wherein the following conditional expression is satisfied:

$$0.5 < POw/fw < 3.0$$

where POw is a distance from an image plane to an exit pupil position at the wide-angle end, and fw is a focal length of the zoom lens at the wide-angle end.

7. The zoom lens according to claim 1, wherein the first lens includes a negative lens closest to an object, and wherein the following conditional expression is satisfied:

$$-3.0 < (R2+R1)/(R2-R1) < -0.3$$

where R1 is a radius of curvature of the negative lens on the object side, and R2 is a radius of curvature of the negative lens on the image side.

8. The zoom lens according to claim 1, wherein the following conditional expression is satisfied:

$$0.2 < m2/fw < 1.4$$

where m2 is a moving amount of the second lens unit during zooming from the wide-angle end to the telephoto end, and fw is a focal length of the zoom lens at the wide-angle end.

9. The zoom lens according to claim 1, wherein the following conditional expression is satisfied:

$$-3.0 < fg1/fw < -0.5$$

where fg1 is a focal length of a lens closest to an object in the zoom lens, and fw is a focal length of the zoom lens at the wide-angle end.

10. The zoom lens according to claim 1, wherein the following conditional expression is satisfied:

$$3.5 < TTDw/skw < 22.0$$

where TTDw is an overall length of the zoom lens at the wide-angle end.

11. The zoom lens according to claim 1, wherein the first lens unit consists of a lens having a negative refractive power and a lens having a positive refractive power arranged in this order from the object side to the image side.

12. The zoom lens according to claim 1, further comprising a third lens unit moves during focusing.

13. The zoom lens according to claim 1, wherein the three or more lens units include a third lens unit having a positive refractive power, and a fourth lens unit having a positive refractive power.

14. The zoom lens according to claim 1, wherein the three or more lens units include a third lens unit having a positive refractive power, and a fourth lens unit having a negative refractive power.

15. The zoom lens according to claim 1, wherein the three or more lens units include a third lens unit having a positive refractive power, a fourth lens unit having a positive refractive power, a fifth lens unit having a negative refractive power, and a sixth lens unit having a negative refractive power.

16. The zoom lens according to claim 1, wherein the three or more lens units include a third lens unit having a negative refractive power, a fourth lens unit having a positive refractive power, a fifth lens unit having a negative refractive power, and a sixth lens unit having a positive refractive power.

17. The zoom lens according to claim 1, wherein a lens unit closest to an object has a negative refractive power.

18. The zoom lens according to claim 1, wherein the first lens unit monotonically moves to the image side during zooming from the wide-angle end to the telephoto end.

19. The zoom lens according to claim 1, wherein at least two of the lens units disposed on the image side of the first lens unit move in the same trajectory during zooming from the wide-angle end to the telephoto end.

20. An image pickup apparatus comprising:
a zoom lens;
An image sensor configured to receive an formed by the zoom lens,
wherein the zoom lens includes, in order from an object side to an image side, a first lens unit having a negative refractive power, a second lens unit having a positive refractive power, and three or more lens units,
wherein a distance between adjacent lens units varies during zooming, and
wherein the following conditional expressions are satisfied:

$$4.8 < m1 \cdot f1/skw^2 < 15.0$$

$$2.45 < \beta 2t/\beta 2w < 50.00$$

where m1 is a moving amount of the first lens unit during zooming from a wide-angle end to a telephoto end, f1 is a focal length of the first lens unit, skw is a backfocus at the wide-angle end, β2t is a lateral magnification of the second lens unit at the telephoto end, and β2w is a lateral magnification of the second lens unit at the wide-angle end.

* * * * *